Dec. 26, 1950 S. J. BEGUN 2,535,480
MAGNETIC RECORDING AND REPRODUCING
Filed Aug. 27, 1945 13 Sheets-Sheet 1
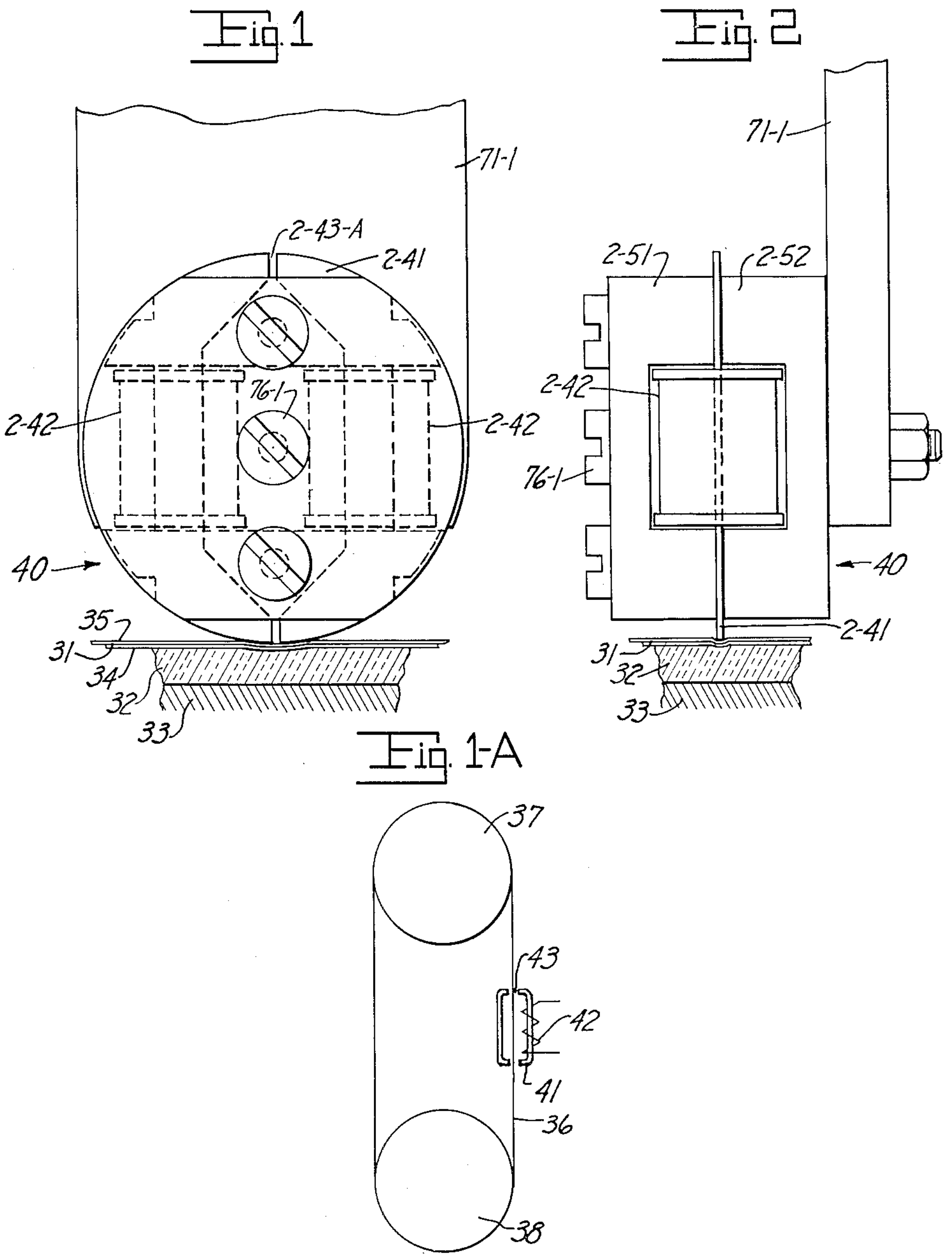
FIG. 1, FIG. 2, FIG. 1-A
INVENTOR.
SEMI JOSEPH BEGUN
BY
PINELES & GREENE
ATTORNEYS

MAGNETIC RECORDING AND REPRODUCING

Filed Aug. 27, 1945 13 Sheets-Sheet 2

INVENTOR.
SEMI JOSEPH BEGUN
BY
PINELES & GREENE
ATTORNEYS

Dec. 26, 1950 S. J. BEGUN 2,535,480
MAGNETIC RECORDING AND REPRODUCING
Filed Aug. 27, 1945 13 Sheets-Sheet 3
Fig. 10-A
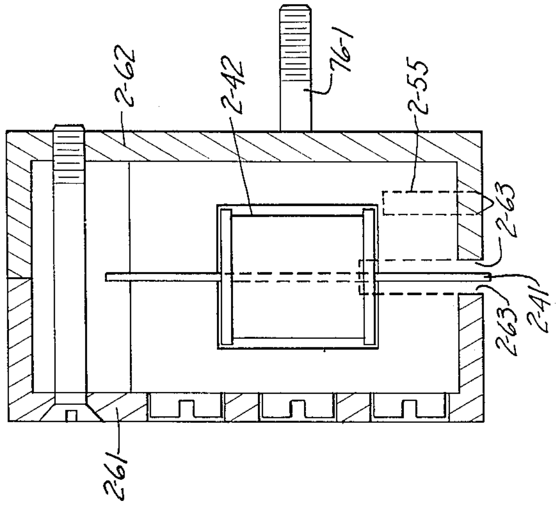
Fig. 10
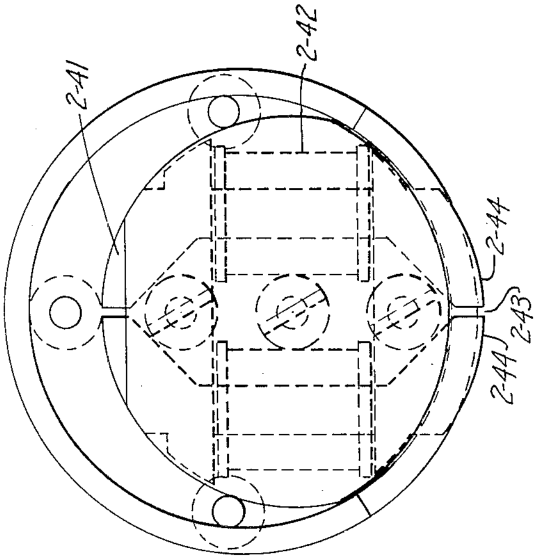
INVENTOR.
SEMI JOSEPH BEGUN
BY
PINELES & GREENE
ATTORNEYS MAGNETIC RECORDING AND REPRODUCING
Filed Aug. 27, 1945 13 Sheets-Sheet 4
Fig. 11
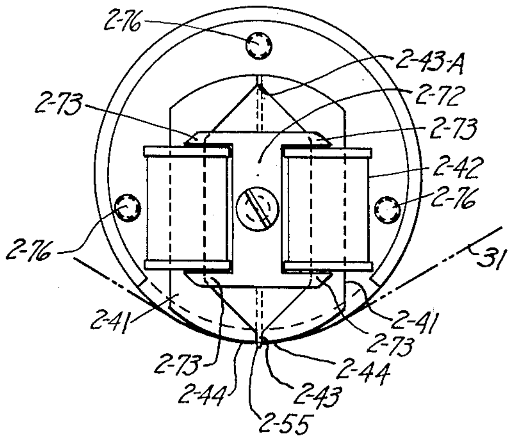
Fig. 12
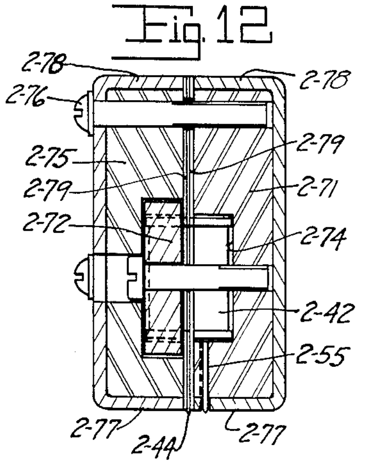
Fig. 12-A
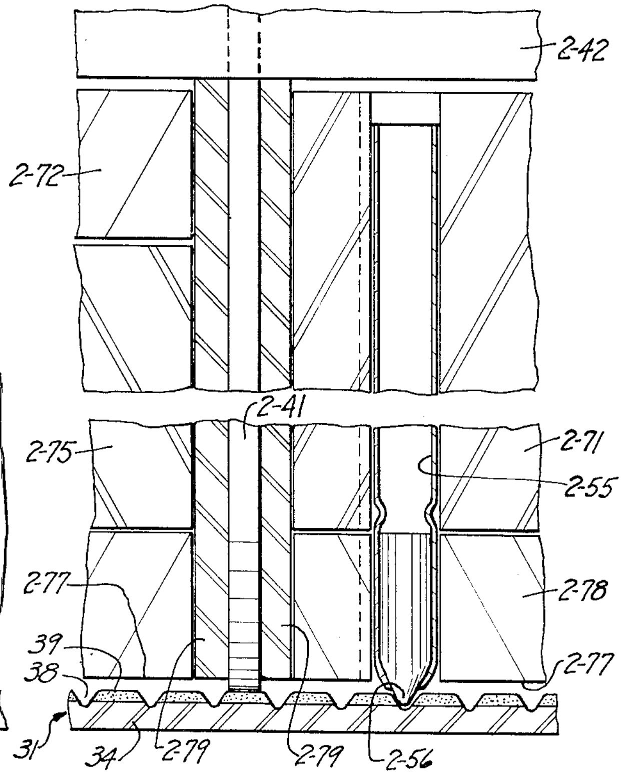
Fig. 11-A
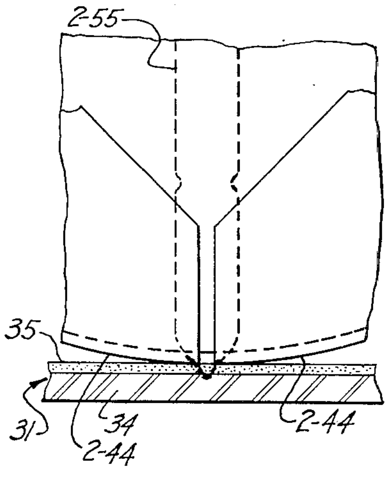
INVENTOR.
SEMI JOSEPH BEGUN
BY
PINELES & GREENE
ATTORNEYS Dec. 26, 1950 S. J. BEGUN 2,535,480

MAGNETIC RECORDING AND REPRODUCING

Filed Aug. 27, 1945 13 Sheets-Sheet 5

INVENTOR.
SEMI JOSEPH BEGUN

BY

PINELES & GREENE

ATTORNEYS

INVENTOR.
SEMI JOSEPH BEGUN
BY Pinelles & Greene
ATTORNEYS

Dec. 26, 1950 S. J. BEGUN 2,535,480

MAGNETIC RECORDING AND REPRODUCING

Filed Aug. 27, 1945 13 Sheets-Sheet 7

INVENTOR.
SEMI JOSEPH BEGUN
BY Pineles & Greene
ATTORNEYS

MAGNETIC RECORDING AND REPRODUCING
Filed Aug. 27, 1945 13 Sheets-Sheet 8
FIG. 20
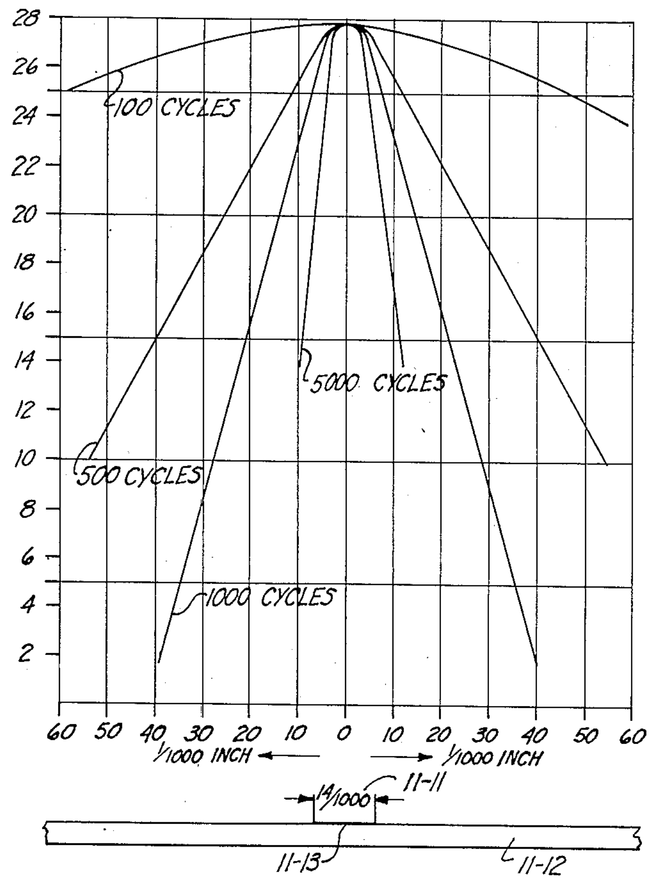
FIG. 20-A
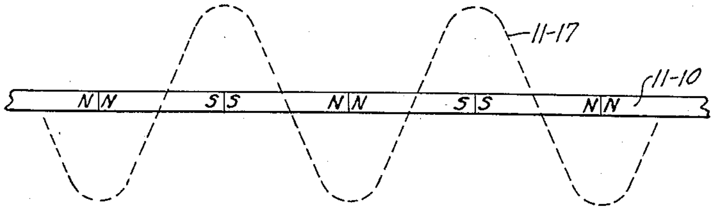
INVENTOR.
SEMI JOSEPH BEGUN
BY
PINELES & GREENE
ATTORNEYS Dec. 26, 1950 S. J. BEGUN 2,535,480

MAGNETIC RECORDING AND REPRODUCING

Filed Aug. 27, 1945 13 Sheets-Sheet 9

INVENTOR.
SEMI JOSEPH BEGUN
BY
PINELES & GREENE
ATTORNEYS

Dec. 26, 1950 S. J. BEGUN 2,535,480

MAGNETIC RECORDING AND REPRODUCING

Filed Aug. 27, 1945 13 Sheets-Sheet 10

INVENTOR.
SEMI JOSEPH BEGUN

BY

PINELES & GREENE

ATTORNEYS

INVENTOR.
SEMI JOSEPH BEGUN
BY
PINELES & GREENE
ATTORNEYS

Dec. 26, 1950 S. J. BEGUN 2,535,480

MAGNETIC RECORDING AND REPRODUCING

Filed Aug. 27, 1945 13 Sheets-Sheet 12

INVENTOR.
SEMI JOSEPH BEGUN
BY
PINELES & GREENE
ATTORNEYS

Dec. 26, 1950 S. J. BEGUN 2,535,480

MAGNETIC RECORDING AND REPRODUCING

Filed Aug. 27, 1945 13 Sheets-Sheet 13

INVENTOR.
SENI JOSEPH BEGUN
BY
PINELES & GREENE
ATTORNEYS

Patented Dec. 26, 1950 2,535,480

UNITED STATES PATENT OFFICE 2,535,480

MAGNETIC RECORDING AND REPRODUCING

Semi Joseph Begun, Cleveland Heights, Ohio, assignor to The Brush Development Company, Cleveland, Ohio, a corporation of Ohio Application August 27, 1945, Serial No. 612,728

14 Claims. (Cl. 179—100.2)

This invention relates to magnetic recording and reproducing and more particularly to magnetic recording and reproducing systems and methods in which magnetic signals are recorded and reproduced by magnetic flux interlinkage between relatively moving magnetic elements of a magnetic recording medium and windings of a magnetic record transducer head which is used either for recording or for reproducing the signals or both.

Among the objects of the invention is a novel combination of a record sheet member having a relatively extended exposed magnetic record track surface of permanently magnetizable material operatively exposed along the surface and a novel arrangement of a magnetic record transducer head for magnetically recording signals along narrow traces of the exposed magnetic record track surface and for reproducing magnetic signals recorded along such traces by flux interlinkage between the windings of the transducer head and an element of such magnetic record traces formed on the exposed record track surface of the record sheet member.

In such novel combination of the invention, the magnetic record transducer head has transducer windings and a magnetic core structure including a gap interlinked with the windings and having two flat thin pole pieces of magnetic sheet material having exposed pole tip edges constituting elongated convex pole faces extending from the opposite sides of the gap and to one side of an elongated element of a magnetic record trace of the record track, the transducer head and the record sheet member being arranged to be held and guided so as to cause successive portions of the moving record track to be convexly flexed into engagement with the pole faces for concentrating the magnetic flux interlinking said windings with a magnetic trace element of said track bridging the gap between the pole pieces during the relative motion between the record track and the transducer head.

The foregoing and other objects of the invention will be best understood from the following description of exemplifications thereof, reference being had to the accompanying drawings wherein Fig. 1 is an elevational view of a combined transducing unit, record track and record track support according to the invention, with parts in section;

Fig. 1A is a diagrammatically representation of a portion of a record track guide assembly that may be used with the transducing unit;

Fig. 2 is a side view of the construction of Fig. 1;

Figs. 10 and 10A are elevational and sectional views of a further form of transducing unit according to the invention;

Fig. 11 is an elevational view of a still further embodiment of a transducing unit of the invention with a cover member removed;

Fig. 11A is an enlarged fragmentary view similar to Fig. 11 showing the combination of a record track and the unit of Fig. 11;

Figs. 12 and 12A are section views of the constructions of Figs. 11 and 11A, respectively;

Figs. 20 and 20A are graphic representations illustrating the operation of the transducing apparatus;

Figure 3:
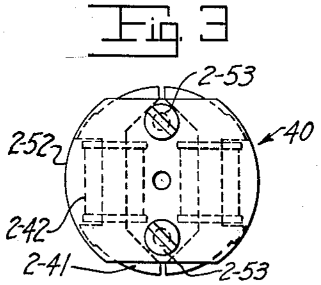
Fig. 3 is an elevational view of the double pole piece transducing unit, shown in Figs. 1 and 2.
Figure 6:
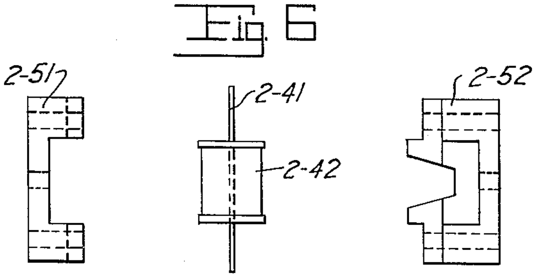
Fig. 6 is an exploded side view of the transducing unit of Fig. 3.
Figure 4:
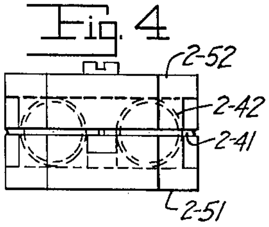
Fig. 4 is a bottom view of the unit shown in Fig. 3.
Figure 7:
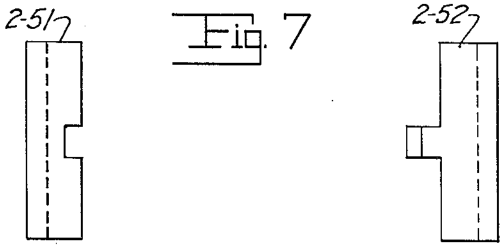
Fig. 7 is a fragmentary exploded top view of the transducing unit of Fig. 3 more clearly showing the interlocking portions.
Figure 5:
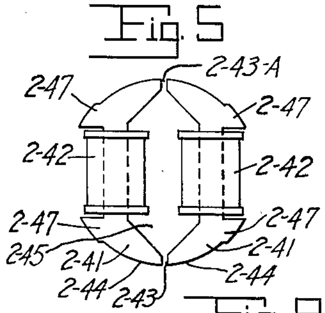
Fig. 5 is an elevational view of the pole pieces and windings of Figs. 1, 2 and 3.

Figs. 1 and 2 show partially in elevation and partially in cross section a portion of a moving record track sheet member 31 resting on the exposed surface of a surface layer 32 on a relatively rigid supporting member 33. The record track sheet member 31 may be formed of a backing or base sheet 34 of relatively strong material, such as craft paper having united to one of its surface layers a stratum 35 of a dispersion compound having dispersed therein finely powdered permanently magnetizable particles of a particle size in the range between about 1 to 4 microns, although a relatively satisfactory recording medium may be obtained with powder particles as large as 15 to 20 microns.

The surface layer of the base material 34 is of an absorbent character and the dispersion compound united thereto is of such character that when it is deposited in liquid form on the exterior of the absorbent surface layer of the base sheet 34 with the magnetizable particles substantially uniformly distributed in the compound, the dispersion compound will enter to a substantial depth the interstices between the particles of the absorbent surface layer 34 and leave on the exterior a thin surface stratum 35 of the dispersion compound with the powder particles substantially concentrated therein, the compound entering between the interstices of the surface layer becoming united to its particles as the compound is solidified. Very excellent recording media of the foregoing type may be made with permanently magnetizable particles of ferro-magnetic metals and their compounds, such as magnetite powder of the type used in paint pigments, or finely powdered permanently magnetizable particles of ferro-magnetic metals and their compounds deposited by electrolysis in a mercury cathode and removed therefrom by distilling off the mercury.

The record sheet member 31 may be formed of a relatively wide sheet made in the form of an endless belt-like loop 36 guided over two revolvably mounted rollers 37, 44 as indicated in Fig. 1—A. The endless record track sheet 36 is impelled in any known manner, for instance, by driving one of the two rollers, the rollers having a surface of friction material, such as rubber, for maintaining frictional coupling with the sheet member and impelling it as the roller is being rotated. Instead of using paper as a backing sheet for such magnetic record track member 31, a sheet of a synthetic resin compound, such as used for making motion picture film or flexible phonograph discs, may be used as a backing sheet for a coating layer of a compound having dispersed therein a fine permanently magnetizable powder substance. Alternatively, such permanently magnetizable powder substance may be embodied in the synthetic resin material out of which the film is cast or extruded, while the material of the film is still fluid and the powdered magnetic material can be finely and uniformly distributed therein.

Such record track sheet member is designed for cooperation with a special type of magnetic record transducer head generally designated 40, shown in Figs. 1 and 2 to 7. The magnetic record transducer head embodies a magnetic core structure shown formed of two thin flat pole pieces 2—41 held aligned in a plane, and transducer windings shown formed of two coils 2—42, each surrounding one of the pole pieces. The thickness of the pole pieces 2—41 is of the order of the thickness of the magnetic record trace along which a record is made on the magnetic record track surface 35 of the record track 31.

The two pole pieces 2—41 are held longitudinally aligned in a plane on the opposite sides of a working gap 2—43 which is shown exaggerated for the sake of clarity, but is only of the order of one-thousandth or two-thousandths of an inch. The outwardly facing edge surfaces 2—44 of the pole pieces 2—41 which border the gap are convexly curved so as to constitute two elongated pole faces arranged so that when a portion of the record track surface 35 of the record sheet member 31 is placed against the pole faces, a record trace portion of the record track surface may be flexed into tangential engagement with the convex pole faces 2—44 of the pole pieces, and thus assure that positive stable contact conditions will be maintained between the pole pieces and the record trace of the record track sheet 31 at the point of contact engagement therebetween.

The narrow magnetic gap region 2—43 formed by the inwardly facing edge surfaces of the pole pieces 2—41 is substantially parallel for a short inward distance of the order of about thirty-thousandths of an inch and the adjoining inward region of the inwardly facing edge surfaces is tapered to provide a widely tapered gap region 2—45 which has relatively great reluctance compared to the magnetic path of the core structure which is interlinked with the transducer windings 2—42. The transducer windings 2—42 are shown in the form of bobbins on which the windings are wound after the bobbin is first placed on the pole piece. The bobbin with its longitudinal central core may be molded of a suitable synthetic resin insulating material and may be provided with a slit for seating it in a centered position on the pole piece, as indicated in the drawings.

The two pole pieces with their bobbins are held in their aligned operative position shown by uniting the two aligned pole pieces to a mounting structure shown formed of two mounting members 2—51, 2—52. One of the mounting members, for instance, the mounting member 2—51 may be made of metal and the two pole pieces may be united thereto in their aligned critical gap position either by soldering, electrical spot welding, or by cementing. In order to make it possible to secure the pole pieces to a metallic mounting member 2—51 by spot welding, each sheet element forming the pole pieces may be provided with laterally protruding extensions 2—47 overlying a flat surface portion of the mounting member 2—51 along which the pole pieces are held flatly aligned so that by applying the electrodes of the spot welding apparatus to such pole piece extension 2—47 and the underlying mounting member 2—51, each pole piece may be readily united by electrical spot welding to its mounting member while they are maintained in their aligned position thereon by a suitable jig.

It will be noted that the pole piece extensions 2—47, which serve as spot welding connections to the metallic mounting member 2—51, are not required to carry any flux and any impairment of their magnetic qualities incident to the spot welding process will not affect the magnetic efficiency of the transducer head. Alternatively, the two pole pieces 2—41 with their bobbin structures 2—42 may be united in their properly aligned critical gap spacing positions to the common mounting member 2—51 by a thin layer of suitable cement having a high curing temperature.

Instead of making the mounting member 2—51 of metal, it may also be made of a molded synthetic resin material formed of a compound which is stable against humidity and temperature variations, a fabric or fibre-impregnated synthetic resin material being particularly suitable for such mounting members. To protect a double-pole-piece unit so formed by uniting the two flat aligned pole pieces to the flat aligning surfaces of a common mounting member 2—51, another generally similar mounting member 2—52 may be placed over the other side of the pole pieces and united to them and to the mounting member 2—51 by cement or solder or spot welding in a manner analogous to that described above. Alternatively, the two pole pieces may be held united in their aligned critical gap positions against the flat aligning surface of the mounting member 2—51 by placing them between the two mounting members 2—51, 2—52 and holding them clamped therebetween as by one or more screws, such as screws 2—53 extending through holes of the mounting member 2—52 and threadedly engaging threaded holes of the mounting member 2—51.

Instead of using two clamping screws 2—53, a single clamping screw extending through a central hole of the two mounting members is sufficient to hold the two aligned pole pieces with their winding bobbins aligned in their operative position between the two mounting members so as to constitute therewith a compact self-supporting double-pole-piece unit in which the thin flat pole pieces are maintained in their suitably aligned critical gap spacing position.

Figs. 3 through 7 show various views of the double pole piece unit and clearly illustrate the construction described above.

In accordance with the invention, a magnetic record track sheet 31 and a magnetic record transducing head 40 of the general type described above are so supported and guided relatively to each other for recording or reproducing signals along narrow record traces of the record track surface magnetic signals that a portion of the record track engaging the convex longitudinally aligned pole faces bordering the gap is always maintained flexed into engagement with the convex pole faces during the relative motion between the record track and the transducer head. In the form of recording arrangement shown in Fig. 1, such guide and contact relationship between the aligned convex pole faces of the transducer head and the record track is maintained by providing the region of the supporting member 33 which supports the record track sheet in its operative relationship relatively to the pole faces during their relative motion with a surface layer 32 of yieldable cushion-like material which permits limited flexing of the portion of the record track sheet member 31 which is engaged by the aligned convex pole faces during their relative motion for making magnetic records or reproducing records from magnetic record traces of the exposed record track surface 35, the transducer head 40 and the record track support 33 being subjected to suitable biasing forces for assuring that the pole faces subject the record track surface portion engaged thereby to limited flexing in the direction toward the cushioning layer 32 in the manner explained above.

A magnetic record track sheet member 31 and a magnetic record transducer head 40 of the general type described above may be utilized for recording magnetic signals along adjacent magnetic record traces of the exposed magnetic record track surface 35 by imparting a longitudinal motion to the record track sheet member 31 in the direction of the longitudinally aligned convex pole faces while the magnetic record transducer head is held biased with its pole pieces against the trace element of the record track surface engaged and flexed thereby and providing the driving mechanism which impels the record sheet 31 with means for imparting to the record transducer head 40 a slow motion in a direction transverse to the longitudinal direction of the sheet member 31 so that the pole faces shall trace on a continuous loop or belt-like sheet member 36 closely spaced adjacent spiral or helical magnetic record traces in any manner well known in the art. The exposed record track surface 35 of the record sheet member 31 may be provided with spiral grooves separating adjacent magnetic record traces of the exposed record track surface 35 in the manner indicated in Figs. 8 and 9 in which a sheet member 31—1 has its exposed record track surface 35—1 provided with a series of adjacent guide grooves 38 separating adjacent exposed magnetic record track traces along which the aligned pole faces of the pole pieces 2—41 are guided in the manner described above for magnetically recording and reproducing magnetically recorded signals.

Figure 8:
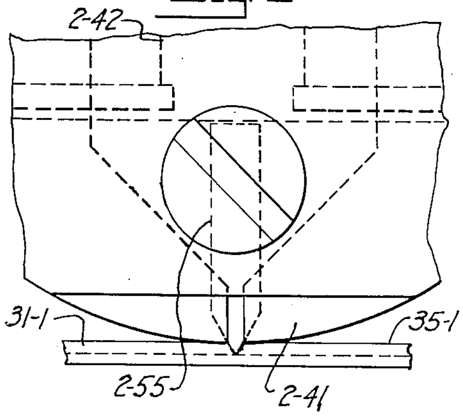
Figs. 8 and 9 are enlarged details in elevation and side view, respectively, of a modified transducing unit and record track embodying the invention.
Figure 9:
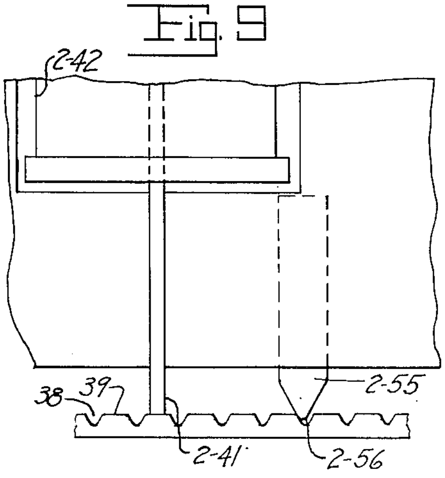

In order to positively guide the longitudinally aligned convex faces along the raised record track trace portions 39 of the exposed record track surface, the magnetic head of Figs. 8 and 9, which is similar to that of Figs. 1 and 2, is provided with a stylus member 2—55 similar to those used as a pickup stylus in standard phonographs, the stylus 2—55 being so mounted in the transducer head as to engage with its stylus tip 2—56 a guide groove 38 of the record track while the pole faces of the pole pieces 2—41 are held in engagement with a raised record track surface trace extending between two adjacent grooves. The cross-sectional shape of the guide groove 38 and the height of the stylus tip and its shape are so related to the level of the raised record track surface portion 39 of the record track and the level of the pole faces as to assure that the pole faces are not lifted out of their operative engagement with the record track trace surface against which they are biased because of interengagement between the stylus tip 2—56 and a portion of the record track groove through which it extends for guiding the pole faces along the raised record track traces of the sheet member 31—1.

Although for convenience in drawing, Figs. 8 and 9 do not show the yielding of the magnetic surface 39 of the record track, this surface actually flexes outwardly under the pole faces in a manner similar to the flexing shown in Figs. 1 and 2. When using an endless belt-like magnetic record track sheet member, such as shown in Fig. 1—A, pregrooved so as to provide thereon spirally extending raised adjacent record traces 39 separated by a continuous spiral groove 38, such record track may be used in combination with a magnetic head of the type shown in Figs. 8 and 9 and provided with a guide stylus 2—55 for automatically guiding the magnetic transducer head in its lateral motion relatively to the motion of the record sheet member 31 for continuously recording on successive spiral traces of the record track surface as the record sheet member is impelled by its drive mechanism.

With such arrangement, it is merely necessary to mount the magnetic transducer head so that it is free to move in a direction transverse to the direction of the motion of the record sheet member 31 while the transducer head is subjected to biasing forces which maintain its longitudinally aligned pole pieces in a position in which they cause each successive element of a record trace engaged thereby to be flexed into engagement with the convex aligned pole faces in the manner explained in connection with Figs. 1 and 2. In other words, the record track sheet member 31 of the foregoing type is subjected to a spiral grooving process before carrying on therewith the magnetic recording traces so that the groove serves as a guide for guiding the record transducing head while its longitudinally aligned pole faces engage successive elements of the spiral record track surface of an endless record track sheet member, such as shown in Fig. 1—A.

The principles of the magnetic recording arrangement of the invention described above in connection with a magnetic record track sheet having the form of a belt-like loop of the type shown in Fig. 1—A, are also applicable to magnetic record track sheets of other shapes, such as a magnetic record track sheet made in the form of a flexible circular disc having on at least one side an exposed magnetic record track surface on which magnetic records are made by a transducer head, such as shown in Figs. 1 and 2, along adjacent convolutions of a spirally extending magnetic record trace in a manner analogus to that used in standard disc-type phonographs in which the record is made by coating or embossing a groove on the exposed surface of the disc.

When using a standard disc-type phonograph mechanism for a magnetic recording arrangement of the invention, it is merely necessary to place a flexible record track sheet member 31 with a central locating hole on the turn table of such phonograph, the surface layer of the turn table underlying the record sheet member being provided with a cushioning surface, such as the cushioning surface 32, so as to make it possible for the portion of the record sheet member engaged by the pole pieces to be flexed into engagement with the aligned convex pole faces.

With such arrangement, the transducer head of the type shown in Fig. 1 is supported at the end of the usually pivotally mounted tone arm so that the longitudinally aligned pole faces are maintained tangentially aligned in the direction of a spiral trace of the exposed record track surface of the sheet member when it is rotated by the turn table. When such pivotally mounted tone arm is used as a support for the transducer head, it may be provided with means either in the form of a weight or a spring for subjecting it to biasing forces which cause the pole faces to convexly flex the portions of the record traces along which they move.

When operating with such phonograph and tone arm arrangement, the circular magnetic record track member having spiral guide grooves formed thereon will effectively guide the tone arm with the transducer head supported thereon along successive convolutions of the record traces extending between adjacent spiral guide grooves provided the transducer head is equipped with a stylus, such as stylus 2—55, engaging a groove of the record track. Such disc-like circular magnetic record sheet members may be provided with such spiral guide grooves by any standard record grooving or embossing processes.

Alternatively, the tone arm may be maintained in its operative position above the rotating disc-like record track sheet member 31 at a fixed level relatively thereto, while biasing means are imposed in the connection between the record transducer head and the portion of the tone arm to which it is connected so as to exert on the transducer head the required biasing forces.

In preparing a sheet-like magnetic recording member of the foregoing type for making thereon a new record, the previously recorded signals may be quickly obliterated by passing the entire sheet structure past the pole gap region of a transversely extending magnet core structure, such as indicated at 41 in Fig. 1—A, which is provided with exciting windings 42 arranged so that when a suitable D. C. or A. C. obliterating current is sent through the windings 42 while the sheet member is moving through the gaps 43 of the magnetic core, the strong obliterating magnetic field produced in the gaps 43 will obliterate all previous recording and restore the magnetic elements of the recording medium to a uniform condition either by bringing them to magnetic saturation or to a magnetically neutral condition in a manner well known in the art.

In the transducer head shown, each pole piece 2—41 is so arranged that it forms one balanced half of a substantially closed magnetic circuit including two alike gaps 2—43, 2—43—A. Each pole piece 2—41 and its surrounding winding coil 2—42 is so arranged as a part of a closed magnetic circuit and they are so correlated to each other that they form two electromagnetically balanced core sections and windings which are electromagnetically substantially alike and substantially symmetrical with respect to their gap for assuring that an external disturbing magnetic flux field traversing the two core and winding sections either in their axial directions or in directions transverse thereto will induce in the interconnected coil windings voltages which are substantially opposite in phase and magnitude and which cancel out. In other words, the pole pieces and windings of the balanced magnetic head structure shown are so arranged and correlated to each other and to their gaps that an external flux field traversing the two winding sections will induce in the interconnected windings voltages which are substantially opposite in phase and magnitude so that they cancel out, while the interconnection of the windings is such that they are effective and efficient in recording signals or in reproducing signals recorded on a magnetic trace engaged by their longitudinally aligned pole faces 2—44.

To obtain the best balance the opposite gap 2—43—A may be bridged by a magnetic element proportioned to be equivalent in its magnetic effect on gap 2—43—A to the magnetic effect on gap 2—43 by the elemental portion of the record track bridging that gap.

Figs. 10 and 10—A show one manner in which a magnetic record transducer head of the type described above may be provided with a magnetic shield formed of two shell members 2—61, 2—62. The two shell members 2—61, 2—62 are formed of a magnetic material having a high permeability, such as magnetic material known under the trade names of Permalloy or Mumetal. To further increase their shielding effects, each shielding shell 2—61, 2—62 may be formed of two internested co-extensive shell layers one surrounding the other, one layer being formed of a magnetic material having a high permeability and the other shell layer being formed of a material having a high electrical conductivity, such as copper or silver.

The two shielding shells 2—61, 2—62 are shaped so as to form a shielding enclosure enclosing substantially all the elements of the magnetic core structure and windings of the transducer head, while providing an arcuate gap 2—63 along the region between the edge portions of the shielding shells adjoining the pole piece portions 2—41 which are provided with the pole faces 2—44 along which they engage the exposed record track surface of the record sheet member 31, in the manner indicated in Figs. 10 and 10—A. In other words, the edge portions of the shielding members 2—61, 2—62 bordering the gap 2—63, and which extend most closely to the pole face ends 2—44 of the pole pieces 2—41, must be kept spaced sufficiently far therefrom as to assure that the gap spacing represents a magnetic reluctance of much higher order than the magnetic reluctance of the main gap 2—43 separating the pole face regions of the pole faces.

Thus, in the practical construction, each gap region 2—63 separating the edges of the shielding members from the pole face regions of the pole pieces should be of the order of about 15 to 20 times greater than the operative gap spacing 2—43 between the pole face regions of the pole pieces.

In order to provide the cushioning effect obtained by the flexible or cushioning layer 32, which causes the record track surface portion engaged by the elongated pole faces to be flexed into contact engagement with the convex pole faces, the record sheet member 31 may be made with sufficient thickness and may embody in itself sufficient yieldability so that when engaged by the pole pieces it will permit slight deformation of its exposed record track surface as it engages the convex aligned pole faces while the record track is moved relatively thereto. For instance, the backing sheet of the record sheet member 31 may be provided with a flexible cushioning stratum on the side underlying the coating 35. Alternatively, the backing sheet may have the cushioning layer formed on its back surface, that is, the surface opposite to the surface having the magnetic record track coating 35 applied thereto. Alternatively, the cushioning stratum may be formed between two layers of backing sheet material, one exposed surface of which has applied thereto a magnetic coating layer 35.

In Figs. 11 to 12—A is shown another arrangement of a magnetic record transducer head of the type described above in connection with Figs. 1, 2, 10 and 10—A. It has two flat pole pieces 2—41, each provided with a transducer winding coil 2—42 and held aligned in a plane across two gaps 2—43, 2—43—A as in the magnetic transducer head described before. The two pole pieces 2—41 are held united in their aligned position to a mounting member 2—71 of electrically insulating material, such as a synthetic resin, for instance, by a suitable cement as described above, or, as shown, by means of an H-shaped clamping member 2—72 of metal, for instance, having at its ends cross arms 2—73 overlying the pole pieces and holding them clamped in their aligned position against the flat aligning surface of the mounting member 2—71 which is provided with a cavity space 2—74 for receiving the transducer winding coils 2—42. The H-shaped clamping member 2—72 is shown held fastened by a single screw, the shank of which engages a threaded hole of the mounting member 2—71.

A complementary mounting member 2—75 is shown affixed to the mounting member 2—71 as by three screws 2—76 so as to form with the mounting member 2—71 a transducer head mounting structure extending symmetrically over the two aligned pole pieces and their transducer coils so that only a short pole face region 2—44 of the pole pieces shall project beyond the adjacent convex exposed surface region 2—77 of the mounting structure 2—71, 2—75. The assembled mounting structure 2—71, 2—75 of the transducer head forms thus a substantially circular structural unit having a circular boundary surface extending between two flat parallel boundary surfaces.

Although the two circular mounting members 2—71, 2—75 may be made in their entirety out of a synthetic resin material, their outer surface region is shown formed by two magnetic shielding shells 2—78 similar to the magnetic shielding shells 2—61, 2—62 described in connection with Figs. 10 and 10—A. In order to prevent the shielding shells 2—78 from magnetically short circuiting the effective gaps between the pole pieces, their facing edge regions are held spaced apart by two spacer members 2—79 of electrical insulating non-magnetic material, the two spacer members 2—79 being shown formed of two flat sheet members co-extensive with the circular boundary of the shell members 2—78 and they are held united with the pole pieces placed between them in their aligned position against the flat aligning surface of the mounting member 2—71 by the clamping member 2—72, before the other mounting member 2—75 with its magnetic shell 2—78 is affixed to the mounting member 2—71.

The transducer head of Figs. 11 and 12 is also shown equipped with a stylus 2—55 arranged in a manner similar to that described in connection with Figs. 8, 9, 10 and 10—A for guiding the magnetic head along the raised record traces 39 when a pregrooved record track sheet member 31 having a spiral guide groove 38 is impelled relatively to the transducer head in the direction of the aligned pole faces 2—44, the transducer head being supported, for instance, on a pivotally mounted tone arm similar to those used in disc phonographs, the stylus causing it to be gradually moved in a direction transverse to the motion of the record traces.

In the transducer head arrangement of Figs. 11 and 12, the convex exposed pole tip edges constituting elongated pole faces extending from the opposite sides of the recording gap adjacent one side of an elongated element of a magnetic record trace are held in their operative position by a substantially non-magnetic firm body portion of the transducer head structure provided with a relatively extensive outwardly facing convex guide surface 2—77 shaped to engage and guide a portion of the record track surface as a record trace thereof moved and is flexed into tangential engagement with the convex pole faces. The pole pieces of the magnetic core structure of the transducer head are so held in the firm mounting body of the transducer head structure that their pole faces are exposed through the guide surface of the transducer head into operative engagement with magnetic record trace portions of the moving record track surface so as to concentrate the magnetic record transducing flux interlinking the transducer winding and an element of the record track trace bridging the gap.

Figure 14:
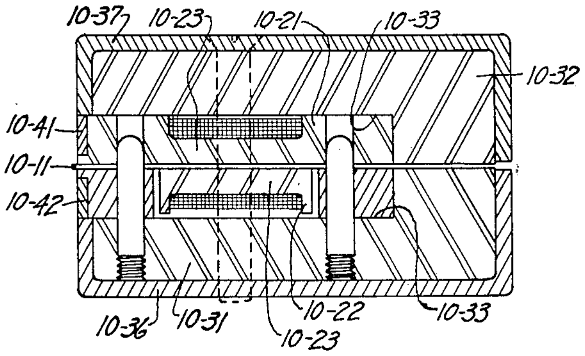
Fig. 14 is a sectional view of the construction of Fig. 13, with parts broken away.
Figure 13:
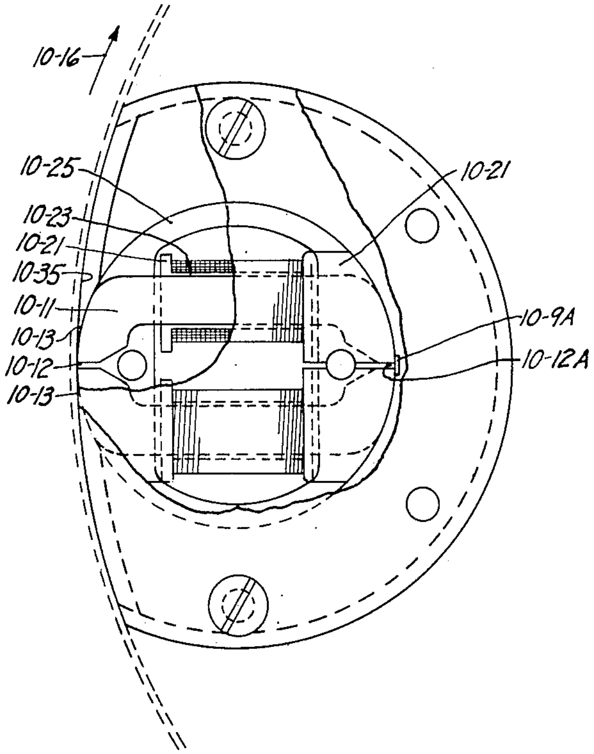
Fig. 13 is a plan view with parts broken away of a modified transducing unit of the invention.

In Figs. 13 and 14 is shown another form of a magnetic transducer head of the general type described above in connection with Figs. 1, 2, 8, 9, 11 and 12.

In the transducer head arrangement shown in Figs. 13 and 14, the coil spool structure of each of the pole pieces is utilized to form a firm support for its thin pole piece. This is particularly important if highly permeable magnetic material, such as Permalloy or Mumetal, is used for the core structure of the pole pieces. As shown in the drawings, each pole piece has united to the opposite flat sides thereof top wall members 10—21, 10—22 which are recessed along their central region so as to form a generally cylindrical circular spool-like structure 10—23 around which the coil may be wound after the two wall members have been first united along both sides of the pole piece unit.

There are available a number of synthetic resin materials which do not undergo material dimensional variations under changing temperature and humidity conditions, and such moldable synthetic resin materials may be used for molding the two spool members 10—21, 10—22. Alternatively, one of the spool members, for instance, the lower spool member 10—22 may be made of metal and the other spool member 10—21 may be made of a molded synthetic resin material.

Both spool members 10—21, 10—22 may be made of the same shape and the two matching halves may be cemented to each other on the opposite sides of the pole pieces, a flat recess between the facing wall surfaces of the two spool halves providing the elongated space within which the flat pole piece is firmly retained and protected.

There are commercially available various synthetic resin cements which may be cured and hardened at relatively high temperatures, such as 200° C. under pressures of the order of about six pounds per square inch. When two such spool half structures 10—21, 10—22 are united to the opposite sides of the pole piece held between them and to each other, they constitute a firm rigid pole piece bobbin unit which has a great degree of stability and which does not require any careful handling when winding thereon the coil or in assembling it, by mass production methods, into the transducer structure. Such cements are also very effective in providing an insulating layer between the pole piece and metallic portions joining it, such as one-half of the bobbin structure, for instance, the bobbin member 10—22, when made out of metal.

Furthermore, such high temperature curing synthetic cements may be also used for laminating a plurality of thin pole piece laminations into a pole piece of an overall thickness of the order of the recording trace, such as .006 to 0.014 inch.

A recording-reproducing head of the type shown in Figs. 13 and 14 may be manufactured on a mass production basis with a high degree of uniformity by arranging them so that the two pole pieces may be united to a common mounting member in a position in which their critical gap region is maintained in a uniform indefinitely set condition.

This is accomplished by making one of the spool half members, as shown, the lower spool half member 10—22, shorter than the other spool half member 10—21, so that the lower flat sides of the two pole piece ends of each pole piece unit is exposed. The two pole piece bobbin units are then united to a common mounting member shown in the form of a ring 10—25, the exposed flat side surfaces of the two ends of each pole piece unit being united to the inwardly facing flat surface portions of the ring-shaped mounting member which protects them and keeps them in an undisturbed stable condition during a substantial operating life.

The two pole piece units may be united in their properly aligned critical gap spacing position to the common mounting member 10—25 by a thin layer of a suitable cement having a high curing temperature of the type described above, and the mounting ring 10—25 may be made of a suitable molded synthetic resin material formed of a material which is stable against humidity and temperature variations, synthetic resin materials having a fibrous or layers of fabric impregnated with a suitable resin, being particularly suitable for such mounting rings.

Alternatively, the mounting ring may be made of metal in which case the exposed flat sides of the two pole pieces may be united in their aligned critical gap position to the common mounting member either by a cement or by a good suitable solder.

With this arrangement, the two pole piece bobbin units united to the common mounting member 10—25 form a self-supporting double-pole-piece unit which maintains all critical elements of the transducer structure in their critically aligned stable operating conditions. The double-pole-piece unit is arranged to be held within a substantially rigid supporting structure shown formed by two wall members 10—31, 10—32 having in their interior a cavity space 10—33 within which the assembled double-pole-piece bobbin unit is firmly held in its operative position so as to expose the pole faces 10—13 adjoining the operative gap 10—12 to portions of a track guided over a convex guide surface 10—35 along the central region of which the narrow pole faces 10—13 are exposed in the manner indicated in Figs. 13 and 14.

The magnetic head structure of Figs. 13 and 14 is also provided with a magnetic shield formed of two shell members 10—36, 10—37 forming the exterior body portion of the two wall members 10—31, 10—32 of the supporting structure. The two shielding shells 10—36, 10—37 are formed of a magnetic material having a high permeability, such as Permalloy or Mu material. To further increase the shielding effect of the shielding shells 10—36, 10—37, each shell may be formed of two co-extensive shell sections, one surrounding the other, and one being formed of a magnetic material of high permeability, such as Permalloy and the other being formed of a material having high electric conductivity, such as copper.

Such magnetic heads are very effective in suppressing disturbing leakage fluxes and cross talk. Its magnetic core structure forms a substantially closed magnetic circuit including magnetic filaments separating the magnetic core structure into two magnetically substantially alike core sections. Each core section is surrounded by its own winding section and the two winding sections are interconnected for carrying electric signals corresponding to the interlinking record flux.

structure having an upright frame member in the form of a vertical wall 51 having a journalling support for a revolvably mounted shaft 52 carrying a guide roller 37 of the type indicated diagrammatically in Fig. 1—A.

Figure 17:
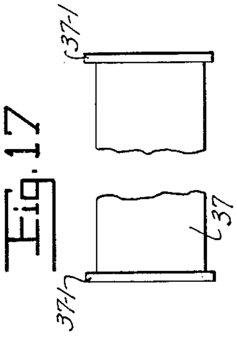
Fig. 17 is a broken elevational view of the record track guide roller of Fig. 15.
Figure 18:
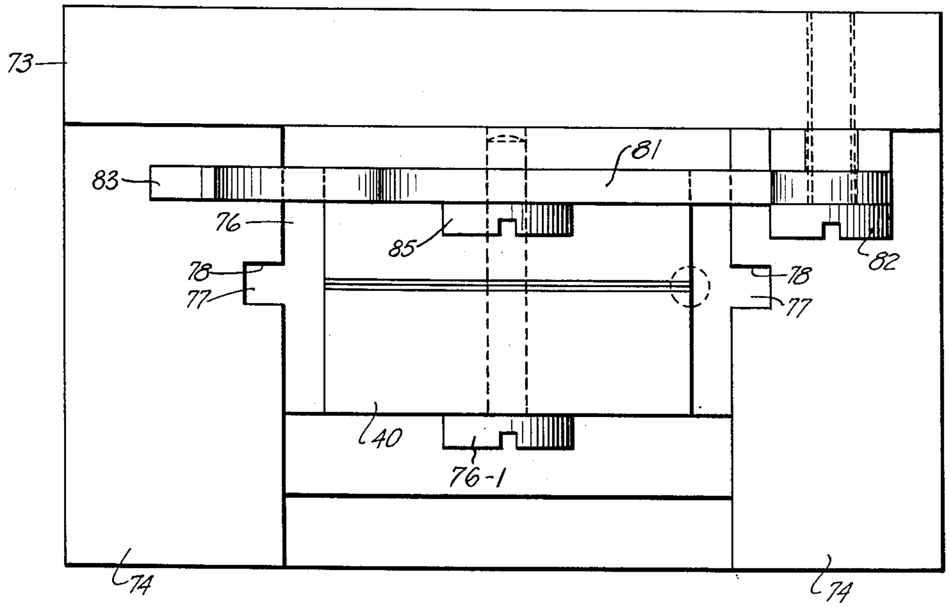
Fig. 18 is a top view of the transducing unit holder and guide assembly of Figs. 15 and 16.

The shaft 52 is arranged to form a cantilever support for the guide roller 37 which serves in conjunction with a similarly mounted lower roller 44 to guide and impel an endless belt-like record sheet member 31 when one of the two rollers, for instance, roller 37, is impelled by imparting a rotary driving motion to its shaft 52 through a suitable motor mechanism mounted behind the frame wall 51 of the device. One of the rollers, for instance, the lower roller 44, not shown, may be suitably tensioned so as to maintain the loop or belt sheet member 31 under tension and cause it to be frictionally impelled by its engagement with the exterior friction surface of the roller 37 which may be formed, for instance, of a rubber-like material 32, as explained in connection with Figs. 1 and 2. In addition, as indicated in Fig. 17, the driving roller 37, is provided with two end flanges 37—1 corresponding to the width of the record sheet loop 31 for confining its motion to a fixed position along the rollers 37 and 44 and prevent lateral displacement of the sheet loop 31.

The magnetic recording or record transducing head 40 is shown carried by an intermediate portion 54 of a supporting arm 55 provided with a guide collar 56 slidably movable on a guide rod 57. The guide rod is suitably supported on the frame structure, for instance, by mounting its two ends in the frame wall 51 and another frame wall portion spaced therefrom, and the supporting arm 51 is so slidably arranged on the guide rod as to permit the rod to slidably move the transducer head 40 relatively to the adjacent region of the sheet member 31 in a direction transverse to the direction of its motion indicated by the arrow 31—2.

Figure 15:
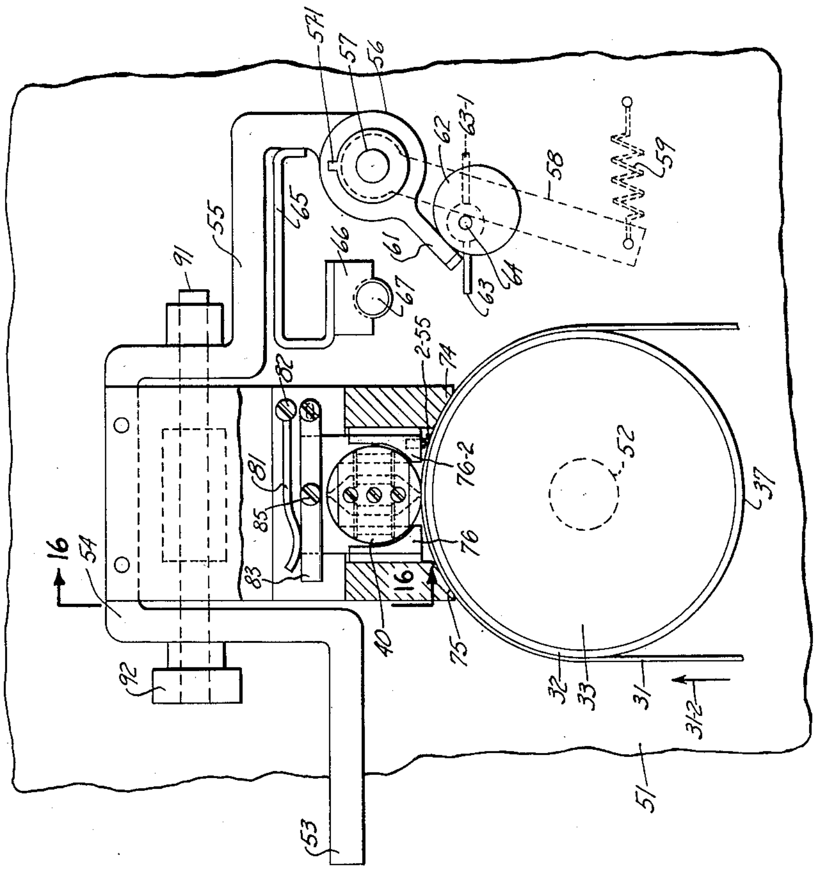
Fig. 15 is a side view with parts in section of a magnetic transducing apparatus embodying the invention.
Figure 16:
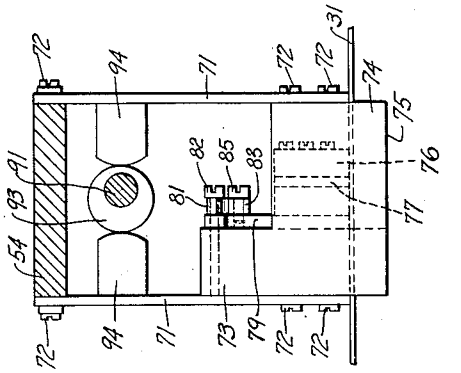
Fig. 16 is a sectional view along the line 16—16 of Fig. 15.

As indicated in Figs. 15 and 16, the transducer head 40 is of the type described in connection with Figs. 1 and 2 and is so supported on the arm 55 that its pole pieces are aligned with their pole faces in the direction of the motion imparted to the sheet loop 31 for recording along a narrow trace of the exposed magnetic record track surface of the sheet member in the manner explained in connection with Figs. 1 and 2. In addition, the supporting arm 55 is so arranged as to make it possible to swing away the transducer head from the position shown in Fig. 15 in which its pole faces engage a record trace of the record sheet to an off position away therefrom in which position the belt-like sheet member 31 is free to be removed from the roller.

As indicated, the collar 56 of the supporting arm 55 is arranged to slide along a key element 57—1 of the guide rod 57 so that a turning or rotary motion imparted to the rod 57 on its journalling end supports will impart a corresponding rotary motion to the arm 55 and the transducer head 40 carried thereby.

The journalled end of the guide rod 57 projecting beyond the frame wall 51 has connected thereto a biasing arm 58 which is interconnected with a biasing spring 59 in such manner that its biasing action causes the supporting arm 55 to be tilted in a direction in which its transducer head 40 is held biased with a predetermined pressure against the record track sheet portion engaged thereby. Alternatively, the arm 55 may be subjected to the biasing action of a weight tending to hold it, together with the transducer head, biased in the direction toward the portion of the record sheet member 31 engaged by the transducer head.

The guide collar 56 of the supporting arm 55 is also provided with a lifting arm 61 engaging the surface of a cam 62 which may be rotated by an arm 63 on the shaft end 64 so that on turning the handle of the cam 62 from the full-line position shown to the dotted-line position 63—1, the cam surface 62 will turn the lifting arm 61 and with it the guide rod 57 with the supporting arm 55 in upward direction against the action of the biasing spring 59. In other words, with the arrangement shown, it is merely necessary to turn the handle 63 between the full-line position and the dotted-line position 63—1 for lifting the transducer head from and returning the transducer head into engagement with the record track sheet.

If the record track sheet 31 is provided with a guide groove 38 of the type described in connection with Figs. 8, 9, 13 and 14, it is merely necessary to provide the transducer head with a guide stylus engaging the guide grooves of the record track for causing the transducer head to be automatically moved in a direction transverse to the direction of the motion of the record sheet while the latter is being impelled by the rotation of the roller 37 for recording on successive raised helical or spiral record traces 39 of the record sheet.

As shown in Fig. 15, the supporting arm 55 of the transducer head has also a forwardly projecting grip end 53 so that by gripping it with the fingers, the supporting arm 55 may be moved longitudinally on the guide rod for bringing the pole faces of the transducer head into engagement with different record traces of the record track sheet, the finger grip 53 permitting also lifting of the transducer head out of engagement with the record track sheet against the action of the biasing forces which tend to return the arm to the position in which the transducer head engages the record track sheet.

The recording arrangement shown is also provided with means for automatically imparting to the supporting arm 55 and the transducer head carried thereby a motion in a direction transverse or lateral to the direction of the motion of the sheet member 31, so as to automatically make a record along successive convolutions of a helical trace along the exposed magnetic record track surface of the endless record sheet loop 31. To this end, the supporting arm 55 carries on a cantilever spring arm 65 and a half nut 66 which engages the thread of a screw 67 which extends in a direction parallel to the shaft 52 of the driving roller 37 and which is driven in synchronized relation to the driving roller 37 for advancing the supporting arm 55 and the transducer head 40 in a direction transverse to the motion of the record sheet at a slow rate suitably correlated to the speed with which the sheet 31 is impelled by the roller 37. The ends of the feed screw 67 are suitably journalled in a portion of the frame wall 51 and in a frame portion spaced therefrom, a portion of the feed screw 67 projecting beyond the frame wall 51 being interconnected through a suitable gearing mechanism to the drive shaft 52 of the roller so that the rotation of the feed screw 67 shall be suitably synchronized with the rotation of the driving roller 37 which impels the record track sheet 31 in its longitudinal motion.

Referring to Figs. 15 to 19, the intermediate portion 54 of the supporting arm 55 carries the In the arrangement shown, each core section is formed of a single pole piece. Each core section and its surrounding winding section is electromagnetically substantially alike and they form two electromagnetically balanced structures which are substantially symmetric with respect to their gap sections and are so arranged and correlated to each other that an external flux field transversing the two winding sections either in their axial direction or in a directon transverse thereto will induce in the interconnected windings voltages which are substantially opposite in phase and magnitude so that they cancel, while they are very effective and efficient in reproducing signals recorded on a magnetic track moving past the pole face region 10—12.

To secure perfect balance, the opposite gap 10—12—A may be bridged by a magnetic element 10—9—A proportioned so as to be equivalent in its effect to the magnetic signal carrier element bridging the effective gap region 10—12 along which the record track is impelled during the recording and reproducing process, for instance, in the direction indicated by the arrow 10—16.

The magnetic record transducing arrangement described above in connection with Figs. 1 to 12A is characterized by the following features: an extended record carrier sheet has an area of magnetically retentive material exposed along a large magnetic record track surface of the sheet. The cooperating record transducing structure, including windings which carry the electric signal impulses corresponding to the magnetic records, has a magnetic core structure which is interlinked with the windings. The core structure has two flat thin pole pieces having exposed pole tip edges constituting elongated pole faces extending from the opposite sides of a gap separating the core structure into two sections.

The pole pieces are held in their operative position by a substantially non-magnetic firm body portion of a supporting structure having a relatively extensive outwardly facing surface through which the pole pieces are exposed for focusing in a narrow element of the track surface engaging the guide surface magnetic signal transducing flux interlinking the track element and the winding for making it possible to make recordings on closely spaced adjacent record tracks of a sheet of magnetic record material, for instance, in the form of adjacent spiral track convolutions.

The magnetic transducer head of Figs. 13 and 14 is effective in preventing cross talk when reproducing magnetic records from one of a plurality of adjacent closely spaced magnetic record tracks. To this end, the guide surface 10—35 of the transducer structure along which the pole face 10—13 bordering the gap region 10—12 are exposed, is provided with magnetic shield sheet elements 10—41, 10—42 extending slightly spaced from each other along the opposite sides of the aligned pole pieces so as to interpose the magnetic body of the sheet elements 10—41 in the path of the spreading flux produced by the magnetic record wave elements of adjacent tracks when the pole pieces play back a recording from a track extending between two other closely spaced tracks.

It is important that the edge portions of the shielding sheet elements 10—41, 10—42 which extend most closely to the pole tip ends of the pole pieces, shall be spaced therefrom by a gap which presents a magnetic reluctance of a much higher order than the magnetic reluctance of the main gap 10—12. Thus, in practical construction, the magnetic gap spacing between the shield elements 10—41, 10—42 from the adjacent portions of the pole pieces 10—11 should be of the order of about 15—20 times the gap spacing 10—12 or more.

The exposed guide surface portions of the transducer head structure may be provided with a smooth finish, for instance, by plating the guide surface with a layer of chromium or polishing it to give it a super-smooth finish to reduce to a minimum the friction incident to the relative motion between the transducer head and the exposed surface of the record sheet engaged thereby. In addition, the exposed guide surfaces may have united thereto a layer of a lubricating medium, such as graphite, by rubbing it into the surface so that a layer of graphite becomes adherently united to the exposed guide surfaces of the transducer head.

According to the invention, a record carrier sheet having an area of magnetically retentive material operatively exposed along a magnetic record track surface of said sheet is combined in a special manner with a special arrangement of a record transducing structure for magnetically transducing record signals therewith, such as recording and reproducing magnetic signals by flux interlinkage with an element of a magnetic signal carrier track formed on the surface of the record carrier sheet.

In the novel combination of the invention, the record transducing structure includes a magnetic core structure interlinked with the signal current- carrying transducing windings, the core structure having a magnetic gap and including two thin pole pieces having exposed pole tip edges constituting elongated pole faces extending from the opposite sides of said gap adjacent one side of an elongated element of the record track. The pole pieces of the record transducing core structure are held in their operative position by a substantially non-magnetic firm body portion of the transducing head structure having a relatively extensive outwardly facing convex guide surface shaped to engage and guide a portion of the track surface.

The pole pieces of the core structure are so held in the firm body of the transducing head structure that their pole faces are exposed through the guide surface into operative engagement with a portion of the moving track surface so as to focus in an element thereof the magnetic signal transducing flux interlinking the track elements and the transducing windings. Guide and impelling means associated with the record carrier sheet and the transducing head structure are so arranged to cause a relative motion between the carrier sheet and the transducing structure so that a portion of the track surface is flexed into sliding engagement with the exposed convex guide surface for causing the pole faces of the core structure to trace on said trace surface a long spiral record track of closely spaced track convolutions and transducing signals with the elements of the spiral record track record by flux interlinkage between the windings and successive elements of the track.

In Figs. 15 to 19 are shown structural features of one form of a magnetic recording device for making magnetic records along magnetic record traces on an endless belt-like sheet member, such as shown in Fig. 1—A with a magnetic transducer head of the type described in connection with Figs. 1 and 2. It comprises a supporting frame transducer head on two links shown in the form of leaf springs 71 connected, as by screws 72 to the arm portion 54 and to a guide structure 73 associated with the transducer head. The guide structure 73 is made of substantially rigid non-magnetic material and may be formed of a non-magnetic metal, such as brass, and it has two footlike guide members 74 having guide surfaces 75 shaped to overlie and engage portions of a record track sheet member 31 moving towards and away from their point of engagement with the aligned pole faces 2—44 of the magnetic transducer head in the manner indicated in Fig. 15.

Figure 19:
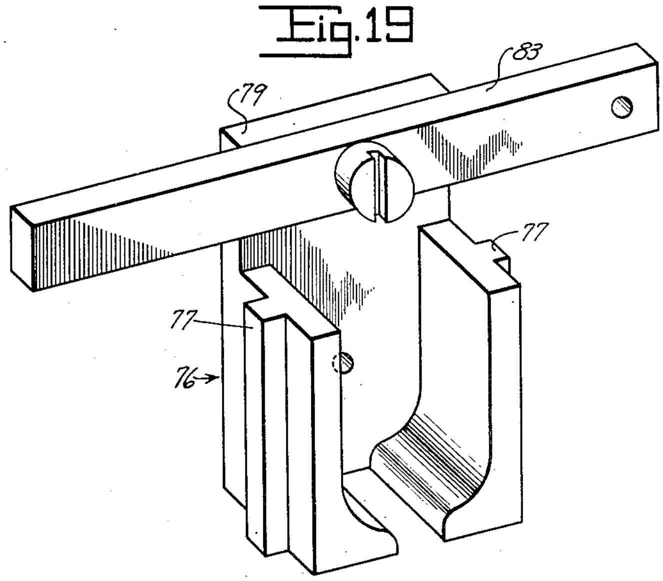
Fig. 19 is a perspective view of the transducing unit holder of Figs. 15, 16 and 18.

The guide members 74 may form integral extensions of the upright wall member of the guide structure 73 and on them is slidably supported a substantially rigid supporting member 76 shown in perspective in Fig. 19 to which the transducer head 40 is secured by a screw 76—1 extending through the central hole of the aligned mounting members 2—51, 2—52 of the transducer head in the manner indicated in Fig. 2. The supporting member 76 is shown provided with two guide tongues 77 guidingly engaging tongue grooves 78 formed in the wall surface regions of the two blocklike guide elements 74 of the guide structure extending on the opposite side of the transducer head 40.

Biasing means shown in the form of a biasing spring 81 held secured, as by a screw 82, to the upright wall member of the guide structure 73 biases the slidably mounted support 76 of the transducer head so that its pole faces 2—44 are presssed with a predetermined pressure against the surface portion of the guide sheet engaged thereby, in the manner indicated in detail in Fig. 15. In the arrangement shown, the biasing spring 81 is arranged to press against a lever arm 83 pivotally held to the upright wall of the guide structure 73 and to the upright member 79 of the supporting member 76 by the screws 82 and 85 respectively, so that the biasing forces exerted by the spring 81 are transmitted by the lever 83 to the support 76 of the transducer head for pressing the pole faces 2—44 of the transducer head against the moving record track sheet and cause the record track sheet elements facing the convex pole faces 2—44 to be flexed into positive stable contact engagement therewith.

In most applications, the lever 83 may be omitted and a biasing spring, such as spring 81, or a weight, may be arranged to exert a biasing action directly on the slidably mcunted supporting member 76 to which the transducer head is secured. It will be noted that the screw 76—1 which holds the transducer head 40 affixed to its support 79 extends through the center of the generally circularly shaped pole face regions 2—44 of the pole pieces so that by slightly loosening the screw 76 the transducer head unit 40 may be adjusted to a position in which its effective gap 2—43 is perpendicular and in the optimum position with respect to the moving elements of the magnetic record track surface engaged thereby, the screw 76—1 being tightened after the transducer head has been thus adjusted in its most effective position.

In carrying out the adjustment of the transducer head, a record previously made on the record sheet is reproduced while the adjustment is made and the screw 76—1 holding the transducer head on its support is tightened in the position in which the output of the transducer head is at a maximum.

When signals are magnetically recorded on narrow adjacent longitudinal traces of a continuous magnetic record track surface, such as a sheet member of the type described in connection with Figs. 1 or 2, or a magnetic tape, difficulties are encountered in reproducing or playing back the signals recorded on the individual magnetic traces because the magnetic wave elements formed by the recorded signals of the adjacent traces produce spreading magnetic flux or leakage fields which are picked up by the record reproducing head when playing back the recorded signals. This action is illustrated by the curves of Fig. 20 in which the playback amplitude of a magnetically recorded signal is plotted as a function of the position of the pole faces of a pole piece structure of a magnetic transducer head in relation to the magnetic record trace recorded by a transducer head with such pole pieces along a narrow trace of a record sheet member 11—12.

The curves of Fig. 20 were obtained with magnetic records made with a transducer head of the type shown in Figs. 1 and 2 on a magnetic tape of steel exhibiting a coercive force of 25 oersteads and moving at a speed of five feet per second. The curves of Fig. 20 were taken with a magnetic transducer head of the type shown in Figs. 1 and 2, the flat pole pieces of which were .014" thick and held centrally aligned in the position indicated in Fig. 20 at 11—11, in a direction perpendicular to the plane of the figure, and the magnetic tape moving along the pole faces likewise in a direction perpendicular to the plane of Fig. 20.

In Fig. 20, the curves marked 100, 500, 1000 and 5000 cycles show the playback level made with signal frequencies of 100, 500, 1000 and 5000 cycles on a magnetic tape of steel exhibiting a coercive force of 25 oersteads, with the playback signals equalized so that they have the same level for each of the frequencies and with the position of the perpendicularly aligned pole pieces opposite the zero position of the abscissa axis of Fig. 20, which indicates the displacement of the pole pieces from their center zero position in thousandths of an inch.

It will be seen that when playing back the 100 cycle record with the pole pieces displaced as much as .060" from the center of the record trace, the level of the playback voltage changes only slightly. However, as the frequency of the recorded signal is increased, the level of the playback voltage falls off for the laterally displaced positions of the pole pieces.

Thus, for 100 cycles, the playback level does not fall off very much, even if the pole pieces of the playback head are displaced from the original zero position by a multiple of the pole piece thickness. On the other hand, for a magnetic record of 5000 cycles, the playback level drops sharply when the pole pieces are displaced from their centered position on which the record is made. Thus, if the pole pieces of the transducer head are laterally displaced by a distance of .014" equal to the thickness of the pole pieces, the playback level of the 5000 cycle signal drops about 20 db. It will be also noted that for a playback level of such 5000 cycle signal, a lateral shifting of the transducer head pole pieces by (+) or (−) .003" will not materially affect the reproducing level.

This may be explained by reference to Fig. 20—A in which the dotted sine wave curve 11—17 represents a sinusoidal wave recorded longitudinally on a record track 11—10 moving in the direction of the arrow. In each element of the magnetic record track, the longitudinal magnetic flux will vary sinusoidally and the distance between two subsequent opposite flux maxima, which equal one-half of the wave lengths, may be considered the length of identical, but oppositely polarized elemental bar magnets constituting the magnetically recorded signals.

The length of the elemental magnets so formed by magnetically recorded signal waves determines the extent to which the leakage flux of these elemental bar magnets, representing the recorded waves, spread laterally therefrom. The bar magnets representing the records of the higher frequencies are shorter and their concentrated leakage flux spreads only little in a direction lateral from the bar magnets. On the other hand, the bar magnets of the low frequency signal records are of substantial length and their concentrated leakage flux extends considerably beyond any lateral direction from the center region of the bar magnet.

According to one phase of the invention, the cross talk difficulties encountered in making magnetic records along adjacent record traces of a magnetic recording medium are substantially eliminated by using as a sheet-like magnetic recording medium a thin layer of magnetic material exhibiting a coercive force of the order of 200 oersteads or more and making it possible to carry on the magnetic recording process on the surface of such record track with such low speed that the elemental bar magnet elements formed on the record traces by the records of the lowest frequency which it is desired to record on the recording medium, are so short that the cross talk level does not exceed 20 db.

Thus, in recorders used for dictating purposes and recording speech, it is sufficient to keep the cross talk level as high as 18 db. In general, when a magnetic recording medium of high coercive force of the order of 200 oersteads or more is used for magnetically recording signals, it is possible to carry on the recording process at such low speed of the order of one foot per second or less, in which case even low frequency signals, such as 500 cycles, when magnetically recorded on such medium, represent such short bar magnets that their leakage flux is substantially confined to the record trace making it possible to record on record traces which are spaced from each other only by a few thousandths of an inch.

Thus, if a signal say of 500 cycles is recorded on a magnetic recording medium at half of the speed at which it has to be recorded on another medium having a lower coercive force, each wave length of the signal recorded on the medium moving at lower speed will have elemental bar magnets which will be only half the length of the elemental bar magnets recorded on the medium moving at twice the speed due to the fact that a long elemental magnet, which represents half of the recorded wave length, has surrounding it a widely spreading concentrated magnetic leakage flux. As the length of such elemental recorded magnet bars become shorter, the concentrated leakage flux of the bar magnet becomes more and more confined to the immediate neighborhood of the elemental magnets.

Accordingly, a medium exhibiting a high coercive force which will make a good magnetic record at a lower speed will record low frequency signals in the form of sufficiently short elemental bar magnets so that their outwardly spreading leakage flux is substantially negligible, thereby eliminating cross talk difficulties notwithstanding the close spacing of the adjacent record traces made with such recording medium. In other words, according to the invention, a magnetic recording system for recording on adjacent closely spaced magnetic record traces utilizes a magnetic recording medium of sufficiently high coercive force as to permit slow operation of the recording medium during the recording and reproducing process, while permitting recording and reproducing of signals of the same frequency range as recording media having a low coercive force, and which, therefore, have to operate at a higher speed at which the elemental magnets of the low frequency signals are of such length that their leakage flux spreads laterally and causes cross talk.

Magnetic recording media made with magnetic powder of the type described above in connection with Figs. 1 and 2 have not only the advantage that they can be operated at a low speed in recording intelligence, such as speech, but they have also a very substantial magnetic reluctance and the magnetic flux impressed on the powdered material during the recording process has much less tendency to spread and will, therefore, be better confined to the immediate neighborhood of the pole piece gap of the recording head. In addition, because of the very good magnetic recording properties of thin platings of ferro-magnetic alloys, such as cobalt and nickel, they likewise may be used with advantage for recording on adjacent closely spaced traces at a low speed at which cross talk difficulties are substantially eliminated.

In particular, a plated magnetic recording medium in which the plated magnetic layer has a thickness of the order of .0003″ and exhibits a coercive force of the order of 150 or 200 oersteads, makes it possible to record thereon signals of the speech frequency range when moving at a speed of about one foot per second so that signals of low frequencies, such as 500 cycles, will be recorded thereon in the form of waves having a wave-length of 0.024 inch which may be considered as bar magnets having a length of only .012″, the overall length of such bar magnet being so short that its leakage flux is substantially confined to the region engaged by the pole faces of the pole pieces.

When magnetic records are made along adjacent magnetic record traces of a magnetic record track sheet member in the manner described above in connection with Figs. 1 and 2, by causing the magnetic head to be automatically moved from trace to trace by a mechanism, such as a rotating screw and half nut connection of the type described in connection with Fig. 15, it is important to make it possible to bring the thin pole pieces of a record playback transducer head into alignment with the narrow record trace of the exposed record track sheet along which the signal has been previously recorded.

In accordance with the invention, this may be readily accomplished by providing the recording mechanism with means for making it possible to adjustably displace in lateral direction the magnetic record transducer head by a distance of the order of the thickness of the pole pieces or the spacing between adjacent record traces. With such arrangement, on playing back the signals recorded on adjacent magnetic record traces of a magnetic record track sheet member of the type described in connection with Figs. 1 and 2, it is merely necessary to slightly adjust the lateral position of the playback head, as by turning a knurled head of a transducer position-adjusting member until the playback level is increased to a maximum value.

This adjustment may be readily accomplished if the recording medium on which the records are made exhibits a sufficiently high coercive force so that it may be moved relatively to the transducer head at a low speed so that the magnetically recorded signals of the lowest frequency form on the record traces elemental magnets which are so short that their leakage flux does not spread substantially beyond the narrow record trace engaged by the pole faces.

Figs. 15 and 16 indicate one simple manner for providing means for laterally adjusting the position of the transducer head pole pieces relatively to the support which causes it to be moved transversely to the direction of the motion of the record track sheet member 31. The adjusting means shown comprise an adjusting pin 91 held in journalling holes of transversely bent portions of the supporting arm 55 of the transducer head so that the adjusting pin 91 may be rotated by a knurled head 92 affixed to one end thereof. The portion of the adjusting pin 91 extending between the two leaf spring links 71 which holds the transducer head affixed to the intermediate portion 54 of the supporting arm is provided with a cam member 93 which is engaged by nose members 94 extending from the adjacent facing portions of the leaf spring 71 so that by turning the adjusting pin 91, the two leaf springs are flexed in one or the other direction. Since only a very small lateral adjustment of the pole pieces is required, the cam 93—the eccentricity of which is shown exaggerated for the sake of clarity—has to have very small eccentricity with respect to the axis of the adjusting pin 91 so that a 180° adjusting motion of the eccenter 93 shall effect adjustment of the pole pieces by a distance of the order of half the pitch of adjacent magnetic record traces or the thickness of the pole pieces.

When a magnetic recording arrangement of the type described above in connection with Figs. 15 to 19 is used for recording on a pregrooved record sheet member of the type described in connection with Figs. 8 and 9, the transducer head unit 40 may be provided with a guide stylus 2—55 of the type described in connection with Figs. 8, 9, 13 and 14, in which case the guide and impelling mechanism which impels the record track sheet member past the transducer head operates without a special cross-feed mechanism, such as a screw and half nut, for automatically displacing the transducer head at a slow rate in a direction transverse to the direction of the motion of the sheet member 31. Alternatively, such stylus 2—55 may be mounted in a portion 76—2 of the supporting member which supports the transducer head on its guide structure 73, in the manner indicated in Fig. 15.

As pointed out above, in most cases it is in general sufficient to affix the transducer head 40 by a mounting screw 75—1 directly to a supporting member, such as supporting member 71—1 shown in Fig. 1, which, in turn, is secured as by two screws 72 to an intermediate portion 54 of the supporting arm 55 which guides the transducer head in a direction transverse to the direction of the motion of the record track sheet member 31, in which case the supporting member 71—1 may be made of a relatively stiff bar similar to the leaf spring 71.

With such arrangement, lateral adjustment of the transducer head may be provided by supporting on the mounting arm an adjusting pin 91 with a cam 93, similar to those described in connection with Figs. 15 and 16. With such arrangement, the cam 93 with its journalling pin 91 are so mounted on the supporting arm 55 of the transducer head that in one extreme position of the eccenter the supporting arm 71—1 by its own biasing action maintains the transducer head in one extreme lateral position so that rotation of the eccenter by 180° produces a lateral displacement of the transducer pole pieces in opposite direction by a desired distance of the order of the spacing between adjacent record traces or the thickness of the pole pieces.

The angular position of the pole face gap region of the transducer head relatively to the record track sheet member may be readily adjusted so that it is in the most efficient operating position in which it reproduces the recorded signal with a maximum level by slightly loosening the mounting screw 76—1, and after adjustment, tightening it again.

In Figs. 21 to 25 are shown structural features of another form of magnetic recording device of the type described in connection with Figs. 15 to 19 for magnetically recording signals along adjacent narrow magnetic record traces of an endless loop or belt-like sheet member 31. It comprises a supporting frame structure having a base wall 50 and an upright frame member in the form of a vertical wall 51 forming one wall of a casing 50—1 enclosing various parts of the drive and related elements of the recording device. The frame structure also includes a frame member in the form of a bar 50—2, the bottom of which is suitably affixed to the base member 50 and the top of which is suitably connected to the top of the wall member 51, as by a cross bar 50—3.

In suitably journalling supports of the wall member 51 is mounted a drive shaft 52 of a guide roller 37 provided with two end flanges 37—1 for guiding and impelling an endless loop or belt-like sheet member 31 in a fixed position thereon in a manner analogous to that described in connection with Figs. 15 to 19. This mounting of the drive shaft 52 with the guide and drive roller 37 carried thereby so that they project freely away from the mounting wall 51 of the mechanism is generally similar to the mounting of the drive shaft and guide rollers of the type used in standard dictating machines in which the drive roller projects freely from the mounting wall so that a wax record may be placed thereon from the free end thereof.

Figure 21:
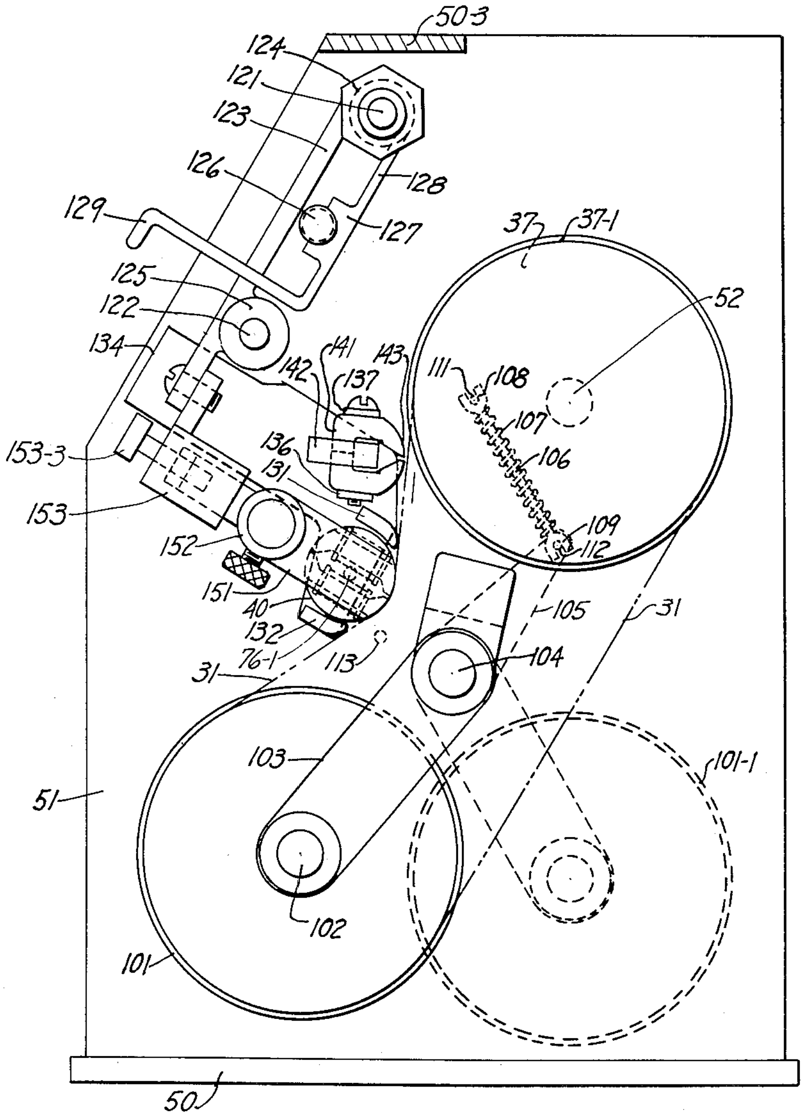
Fig. 21 is a view similar to Fig. 15 of a modified magnetic transducing apparatus in accordance with the invention.
Figure 22:
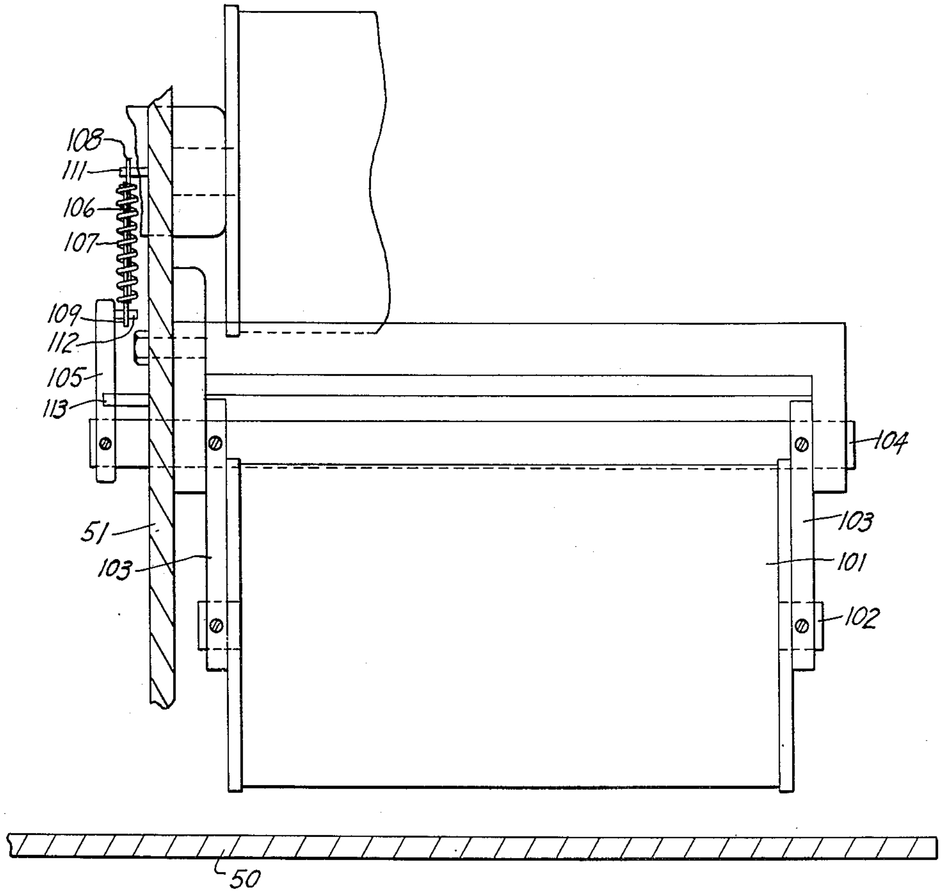
Fig. 22 is a fragmentary view of the apparatus of Fig. 21 showing the record track holder members.

There is also provided a lower guide roller 101 which is revolvably mounted on a shaft 102 carried by two arms 103 which are affixed to a rod 104 which has a suitable journalling support in the upright frame wall member 51 so that the roller shaft 102 with the roller 101 revolvably mounted thereon may be turned from the full-line position shown in Fig. 21 to the dotted line position 101—1 in the manner indicated in Fig. 21. The pivot rod 102 is provided with an arm 105 shown extending from the inner end thereof and suitably affixed thereto. The pivot arm 105 forms one part of a toggle mechanism, the other arm of which is formed by two flat rod-like strips 106 held by an encircling helical compression spring 107 extending between the enlarged heads 108, 109 formed on the opposite ends of the two rods 106 and engaging with the notches formed in the heads 108, 109, respectively, a stud 111 projecting from the inner side of the frame wall 51 and a stud 112 on the arm 105 in the manner indicated in Figs. 21 and 22.

In general, the toggle mechanism formed by the pivot arm 105 and the telescopic slider strips 106 and their biasing spring 107 are so arranged that the biasing action of the spring 106 of the toggle mechanism maintains the guide roller 101 either in the full-line position shown in Fig. 21 or in the dotted line position 101—1, and that by applying a manual force to the guide roller 101 or its supporting arms 103, the guide roller may be swung to either one or the other position while the pivot arm 105 of the toggle mechanism moves over the center line extending between the stop 111 of the toggle mechanism, the end points of which are formed by the stop 111 and the inner end of the roller supporting rod 104.

As will be seen from Fig. 21, when the lower guide roller 101 is held in the full-line position, the distance between the center shafts 52, 102 of the two guide rollers 37, 101 is considerably greater than when the guide roller 101 is swung to its dotted-line position 101—1. This pivotal mounting support of the lower guide roller 101 is so designed that when it is held in the full-line position shown, it will keep and guide an endless loop or belt-like record track sheet member 31 in tensioned condition past the pole pieces of a magnetic transducer head 40 suitably supported so as to engage with the convex pole faces of the pole pieces a portion of the record sheet member 31 moving past it, the distance between the two rollers being sufficiently shortened when the guide roller 101 is swung to the dotted-line position 101—1 as to loosen the sheet member loop 31 and permit its ready removal from its position on the guide rollers 37, 101.

A suitable stop pin 113 projecting from the inner side of the frame wall 51 is arranged to be engaged by the pivot arm 105 of the roller supporting rod 104 so as to fix the position of the guide roller 101 when it is swung to the shortened dotted-line position 101—1. The magnetic record transducing head 40 is arranged to be held and guided in engagement with a flexed portion of the tensioned record track sheet loop 31 by a transverse guide and supporting structure arranged so as to cause the convex pole faces of the transducer head to be displaced transversely across the direction of the motion of the record track sheet 31 while it is being impelled by the drive roller 37 in the direction of the aligned pole faces, the rate of the transverse displacement of the transducer head being correlated to the linear speed imparted to the record sheet member 31 so as to make a record along or reproduce a record from a succession of closely spaced narrow helical or spiral record traces successively engaged by the pole faces, while the successive elements of the record traces of the record sheet member are flexed into engagement with the convex pole faces.

In the arrangement shown, the support and guide structure of the transducer head comprises two guide rods 121, 122 held fixed in wall portions of the upright frame wall 51 and wall member 50—2 and a carriage structure 123, the carriage structure 123 having suitable sleeve members 124, 125 slidably mounted on the guide rods 121, 122 so as to permit free slidable motion of the carriage along the two rods in a direction transverse to the direction of the motion of the record track sheet member 31. In using a record track sheet member 31 which is pregrooved so as to provide a guide groove for guiding a guide stylus 2—55 of a transducer head of the type described in connection with Figs. 8 and 9, the arrangement described above will permit ready recording and playback of the records without resort to any special mechanism for imparting the transverse motion to the carriage and the transducer head because the engagement of the guide stylus of the transducer head with the guide groove will impart to the transducer head and the carriage connected thereto the required lateral displacement which is automatically synchronized with the linear motion of the record track.

Figure 23:
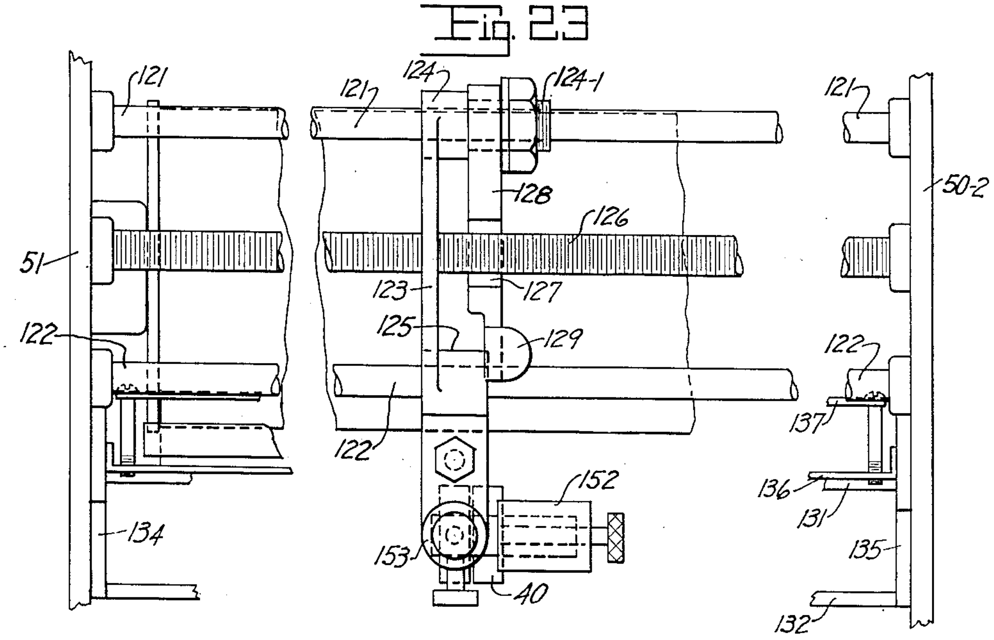
Figs. 23 and 24 are front and side views, respectively, of the transducing head feed structures of the apparatus shown in Figs. 21 and 22.
Figure 24:
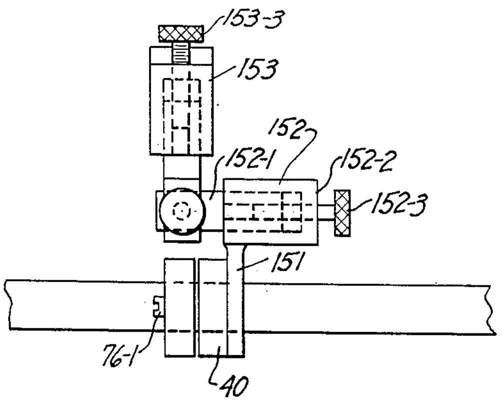
Figure 25:
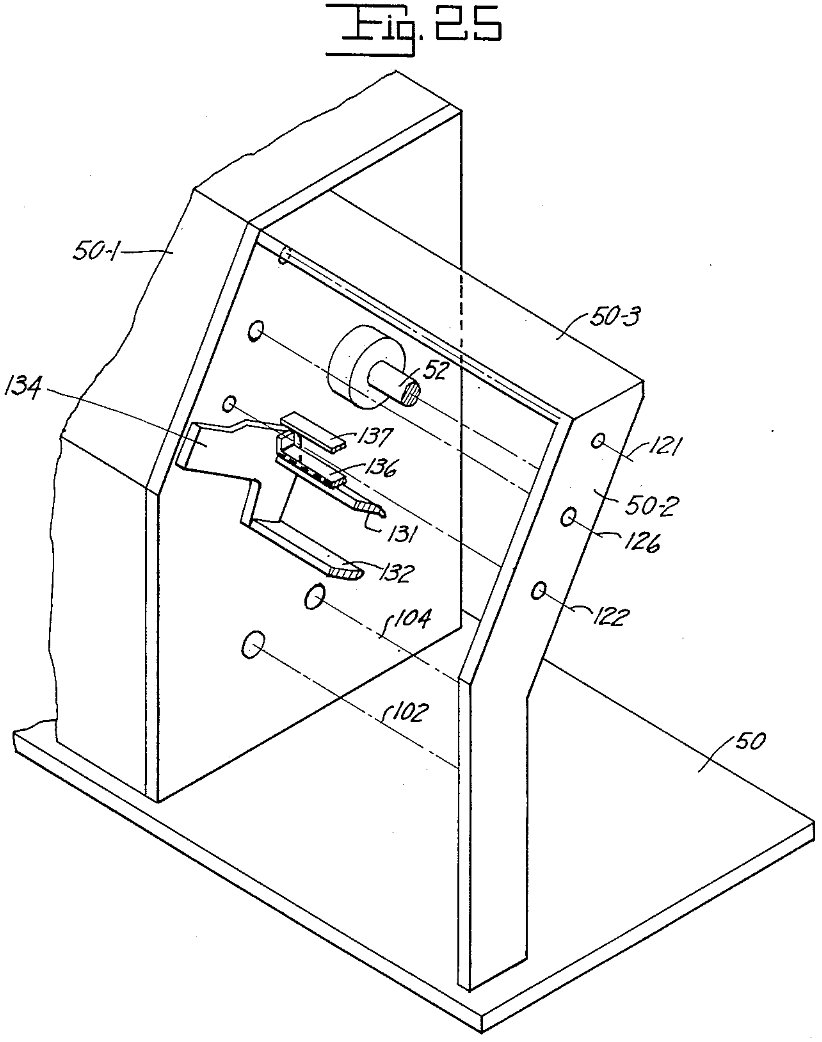
Fig. 25 is a perspective view of the apparatus of Figs. 21 through 24 with parts broken away.

The recording arrangement of Figs. 23 and 24 is also shown provided with means for automatically imparting to the carriage and the transducer head carried thereby a transverse motion correlated to the linear motion of the record track sheet member. There is provided to this end an additional feed screw 126, the ends of which are suitably journalled in the frame wall 51 and the wall member 50—2, the inner end of the feed screw 52 being interconnected through a suitable gearing mechanism with the roller drive shaft 52 so as to impart to a half nut 127 engaging the feed screw 126 a slow transverse motion synchronized with the linear motion imparted to the record track sheet member so that by providing an interconnection between the carriage and the feed screw, the transducer head will be automatically moved in lateral direction for making new records along closely spaced helical or spiral traces of the exposed magnetic record track surface or to reproduce magnetic records made on such traces.

In the arrangement shown, the half nut 127 is carried by an arm 128 provided with a collar rotatably mounted on an extension of sleeve 124 and subjected to a biasing force of a spring, not shown, so as to maintain the half nut 127 in engagement with the feed screw 126. The half nut arm 128 is also provided with an extension having a finger grip 129 arranged so that by gripping and pressing it against the action of the biasing spring, the half nut may be readily disengaged from the feed screw and the carriage with the transducer head moved laterally for readily bringing the pole face of the transducer head into engagement with any desired magnetic record track trace of the record track sheet loop 31.

In the recording device of Figs. 21 to 25, in order to facilitate proper guidance of the moving record track sheet member 31 into engagement with the convex pole faces of the gap region of the transducer head pole pieces, the recording device of Figs. 21 to 25 is also shown provided with two longitudinal guide members 131, 132 held so that they are engaged by the tensioned moving recording track sheet loop 31, the elongated guide members 131, 132 being suitably supported by the bracket arms 134, 135 held in position by the frame wall 51 and frame member 50—2, the elongated guide member 131 extending in transverse direction across the full width of the moving record track sheet member 31.

The two brackets 134, 135 which serve as a support for the two guide members 131, 132 are also shown utilized to serve as a support of two mounting bars 136, 137 which hold in position opposite the moving record track sheet member 31 a magnetic obliterating or erasing structure 141. The obliterating structure 141 may be formed of a stack of magnetic laminations and a winding coil 142 surrounding the stack of laminations and mounted thereon so that when energized by an obliterating current, an obliterating magnetic field of the required strength will be produced across the gap 143 of the magnetic core structure which extends transversely across the entire width of the moving sheet.

The core structure 141 is so arranged and mounted that the exposed pole faces of the laminations bordering the gap 143 and facing the elements of the moving sheet member 31 are in direct engagement therewith so as to subject the successive elements of the record sheet 31 moving past the magnetic gap 143 to the strong obliterating fluxes produced by the obliterating current passing through the obliterating windings 142 and bring about simultaneous obliteration of all the record traces extending through the entire width of the record track sheet. With this arrangement, it is merely necessary to pass the record track sheet once past the transducer head for obliterating all previous records made thereon and restoring it to a magnetically uniform condition.

Such obliterating structure may be used for obliterating the previously made magnetic records either by using a D. C. obliterating current for bringing the elements of the magnetic recording medium of the record track sheet to a uniform magnetically saturated condition. Alternatively, the obliterating forces may be carried on with a relatively high frequency obliterating current so that all elements of the record track sheet member moving past the obliterating gap 143 are brought to a magnetically neutral condition.

As indicated in Figs. 21, 23 and 24, the magnetic transducer head 40 is supported by the carriage structure through an adjusting structure 151, 152, 153 which are arranged to permit gradual, incremental and adjustable displacement of the transducer head pole faces with respect to the elements of the record track sheet member engaged thereby. The center screw 76—1 which holds the transducer head 40 clamped to the adjusting structure 151 makes it possible to adjust the radial position of the gap position of the pole pieces relatively to the record track sheet member in the same manner as explained in connection with Figs. 15 to 19.

The adjusting structure 152 is shown formed of a hollow sleeve member in which is longitudinally guided an inner differential member 152—1, the end wall portion 152—2 of the member 152 and the inner slider member 152—1 being provided on the internal threads of different pitches so that by rotating the knurled head 152—3 provided with threads of correspondingly different pitches engaging the threaded portions of elements 152, 152—1, a rotation of the screw 152—3 will result in a slight differential movement between the element 152 and element 152—1 to permit lateral adjustment of the pole faces with respect to the record traces by a distance of the order of the pitch between adjacent record track traces.

The adjusting structure 153 has elements similar to the elements 152—1, 152—2 and 152—3 so that by turning the knurled screw head 153—3 of the adjusting structure 153, the pole faces may be moved toward or away from their position of engagement with the record track sheet for adjusting the contact pressure therebetween.

Figure 26:
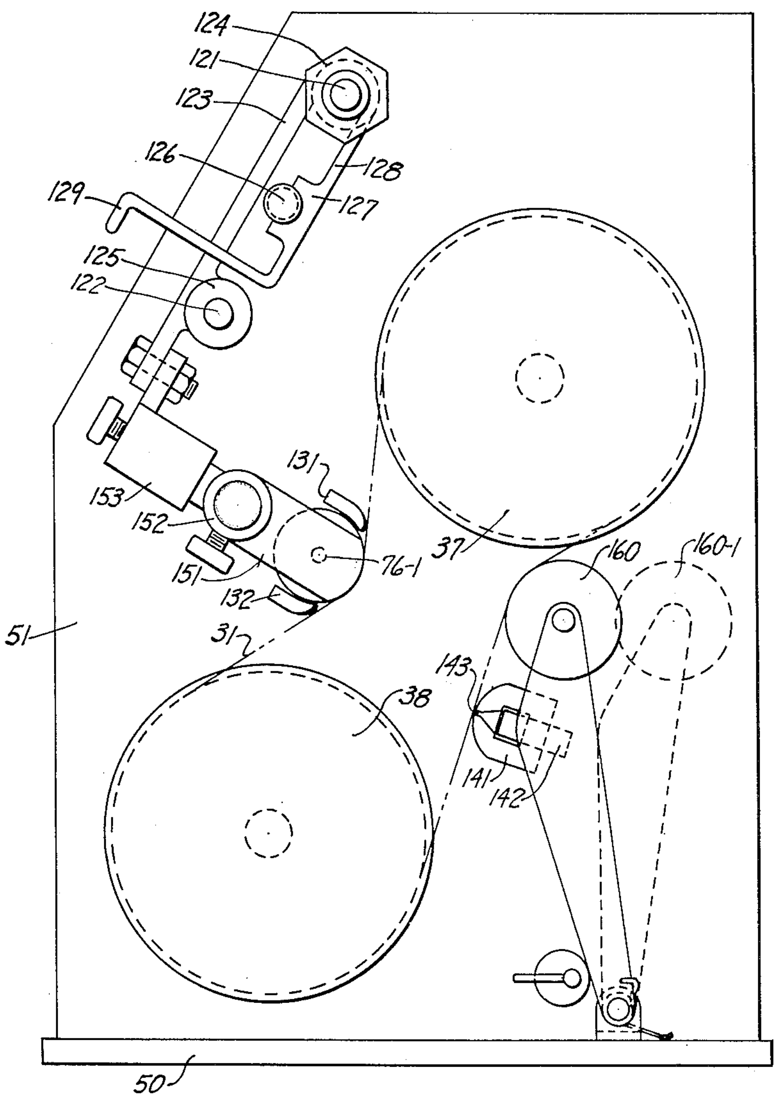
Fig. 26 is a view similar to Figs. 15 and 21 of a further form of magnetic transducing apparatus incorporating the invention.

Fig. 26 is a modification of the recorder shown in Figs. 21 to 25, and in this arrangement the shafts of both guide rollers are held in fixed position on the frame wall and the record track sheet is tensioned by an auxiliary roller 160 extending transversely across the sheet member and moved between the full-line position to the dotted-line position 160—1 in which the sheet member is loosened and may be removed from the two guide rollers 37 and 38.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In a magnetic record transducing apparatus for recording or reproducing signals on successive elements of a relatively moving magnetic record track surface of a limp sheet record; a record transducing head comprising a magnetic core structure constituting a substantially closed magnetic circuit and having pole tips separated by a substantially non-magnetic gap for contact with a contact portion of the record track surface, and magnetic linkage of track surface elements bridging the gap with flux variations corresponding to the signals; said core structure having core elements held in operative position by substantially non-magnetic mounting elements beyond which said pole tips project in an outward direction toward the contacting track surface portion; both projecting pole tips having outwardly facing convex pole faces aligned on opposite sides of the gap to form parts of a generally continuous elongated smoothly-curved pole guide surface convex in outward direction and bordering the opposite sides of the gap; and in combination therewith guide means including a guide structure underlying said record member yieldably supporting an extended portion of said limp sheet member longer than the pole faces for movement with its track surface past and in contact with said pole tips along a flat guide-path which at said contact portion diverges from and is less convex in said outward direction than said pole-guide surface; and biasing means for pressing both pole faces and the guide structure underlying the contacting portions of the track surface toward each other and causing a continuous moving surface portion of the record track overlying said support structure to be flexed against said substantially continuous convex pole-guide surface and to be guided toward and away from said gap along a substantial length of both pole faces in the absence of tensioning forces tending to tension said record member in the direction of its motion.

2. In a magnetic transducing apparatus as claimed in claim 1, said guide structure being movably mounted.

3. In a magnetic transducing apparatus as claimed in claim 1, said guide structure being revolvably mounted.

4. In a magnetic transducing apparatus as claimed in claim 1, said guide structure being shaped to guide the record member and its track surface along a guide path which at said contact portions is flat and diverges in said outward direction away from both pole faces on both sides of said gap.

5. In a magnetic record transducing apparatus as claimed in claim 1, said guide structure being shaped to guide the record member and its track surface along a guide path which at said contact portions is concave and diverges in said outward direction away from both pole faces on both sides of said gap; said guide structure including generally straight guide elements for holding the entire width of the endless sheet in a path within which the said contact portion is readily engaged with and flexed by the pole faces in said outward direction.

6. In a magnetic record transducing apparatus for recording or reproducing signals on successive elemental portions of adjacent surface traces on a relatively moving magnetic record track surface formed on a limp endless record sheet member said apparatus comprising; a record transducing unit head comprising windings and a magnetic core structure constituting a substantially closed magnetic circuit interlinked with said windings and having pole tips separated by a substantially non-magnetic gap for contact with a contact portion of the record track surface and magnetic linkage of track surface elements bridging the gap with magnetic flux variations corresponding to the signals; guide structure including substantially non-magnetic elements forming a smooth record track guiding surface substantially wider than the pole tips and from which guide surface said pole tips project in an outward direction toward said contact portion of the record sheet member; the projecting pole tips being formed of magnetic sheet material held aligned in a plane and having generally convex pole faces together forming portions of a generally smoothly curved pole-guide surface convex in said outward direction for engagement with a record trace of the record track moving along the record track guiding surface and flexing the engaged portion of the moving record trace into engagement with the record track surface of said sheet member.

7. In a magnetic record transducing apparatus for recording or reproducing signals on successive elemental portions of adjacent surface traces on a relatively moving magnetic record track surface formed on a limp endless record sheet member said apparatus comprising; a record transducing unit head comprising windings and a magnetic core structure constituting a substantially closed magnetic circuit interlinked with said windings and having pole tips separated by a substantially non-magnetic gap for contact with a contact portion of the record track surface and magnetic linkage of track surface elements bridging the gap with magnetic flux variations corresponding to the signals; guide structure including substantially non-magnetic elements forming a smooth record track guiding surface substantially wider than the pole tips against which the record track may be held by tension and from which guide surface said pole tips project in an outward direction toward said contact portion of the record sheet member; the projecting pole tips being formed of magnetic sheet material held aligned in a plane and having generally convex pole faces together forming portions of a generally smoothly curved pole-guide surface convex in said outward direction for engagement with a record trace of the record track moving along the record track guiding surface and flexing the engaged portion of the moving record trace into engagement with the record track surface of said sheet member.

8. In a magnetic record transducing apparatus as claimed in claim 1, said guide structure being movably mounted and shaped to guide the record member and its track surface along a guide path which at said contact portion is concave and diverges in said outward direction away from both pole faces on both sides of said gap.

9. In a magnetic record transducing apparatus as claimed in claim 1, said guide structure being revolvable and shaped to guide the record member and its track surface along a guide path which at said contact portion is flat and diverges in said outward direction away from both pole faces on both sides of said gap.

10. In a magnetic record transducing apparatus as claimed in claim 1, said guide structure being revolvable and shaped to guide the record member and its said track surface along a guide path which at said contact portion is concave and diverges in said outward direction away from both pole faces on both sides of said gap.

11. In a magnetic record transducing apparatus as claimed in claim 1, said guide structure comprising a revolvably mounted guide member having a generally flat surface underlying the record member.

12. In a magnetic record transducing apparatus as claimed in claim 1, said guide structure comprising a revolvably mounted guide member having an endless guide surface underlying the record member.

13. In a magnetic record transducing apparatus as claimed in claim 1, said guide structure comprising a revolvably mounted guide member having an endless cylindrical guide surface underlying the record member.

14. In a magnetic record transducing apparatus for recording or reproducing signals on successive elements of a relatively moving magnetic record track surface of a deformable record stratum containing magnetizable material; a record transducing head comprising a magnetic core structure constituting a substantially closed magnetic circuit and having pole tips separated by a substantially non-magnetic gap for contact with a contact portion of the record track surface, and magnetic linkage of track surface elements bridging the gap with flux variations corresponding to the signals; said core structure having core elements held in operative position by substantially non-magnetic mounting elements beyond which said pole tips project in an outward direction toward the contacting track surface portion; both projecting pole tips having outwardly facing convex pole faces aligned on opposite sides of the gap to form parts of a generally continuous elongated smoothly-curved pole guide surface convex in outward direction and bordering the opposite sides of the gap; guide means including a guide structure underlying said deformable record stratum and supporting an extended portion thereof longer than the pole faces for movement with its track surface past and in contact with said pole tips along a guide path which at said contact portion diverges from and is less convex in said outward direction than said pole-guide surface; and biasing means for pressing both pole faces and the guide structure toward each other and causing a continuous moving surface portion of the deformable stratum overlying said guide structure to be flexed against said substantially continuous convex pole-guide surface and to be guided toward and away from said gap along a substantial length of both pole faces in the absence of tensioning forces tending to tension said deformable stratum in the direction of its motion.

SEMI JOSEPH BEGUN.

REFERENCES CITED

The following references are of record in the file of this patent:

UNITED STATES PATENTS

| Number | Name | Date |
|---|---|---|
| 900,392 | Kirkegaard | Oct. 6, 1908 |
| 1,828,189 | Kiliani | Oct. 20, 1921 |
| 1,828,190 | Kiliani | Oct. 20, 1931 |
| 2,229,293 | Huntley | Jan. 21, 1941 |
| 2,309,857 | Middleditch | Feb. 2, 1943 |
| 2,361,752 | Eilenberger | Oct. 31, 1944 |
| 2,432,162 | Jones | Dec. 9, 1947 |

FOREIGN PATENTS

| Number | Country | Date |
|---|---|---|
| 805,434 | France | Nov. 19, 1936 |
| 693,664 | Germany | July 16, 1940 |
| 880,559 | France | Mar. 30, 1943 |
| 585,259 | Germany | Sept. 30, 1933 |